United States Patent
Taguchi et al.

(10) Patent No.: US 7,022,170 B2
(45) Date of Patent: *Apr. 4, 2006

(54) INK FOR JET RECORDING AND INK SET

(75) Inventors: Toshiki Taguchi, Shizuoka (JP); Naotaka Wachi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 118 days.

This patent is subject to a terminal disclaimer.

(21) Appl. No.: 10/671,529

(22) Filed: Sep. 29, 2003

(65) Prior Publication Data

US 2004/0066438 A1 Apr. 8, 2004

(30) Foreign Application Priority Data

Sep. 30, 2002 (JP) .......................... P.2002-285610

(51) Int. Cl.
*C09D 11/02* (2006.01)

(52) U.S. Cl. ............................... 106/31.46; 106/31.48; 106/31.5

(58) Field of Classification Search ............ 106/31.27, 106/31.46, 31.48, 31.5
See application file for complete search history.

(56) References Cited

U.S. PATENT DOCUMENTS

| | | | |
|---|---|---|---|
| 2003/0213405 A1* | 11/2003 | Harada et al. ............ | 106/31.47 |
| 2004/0020408 A1* | 2/2004 | Yabuki ..................... | 106/31.27 |
| 2004/0050291 A1* | 3/2004 | Taguchi et al. .......... | 106/31.27 |
| 2004/0053988 A1* | 3/2004 | Taguchi et al. .............. | 514/419 |
| 2004/0094064 A1* | 5/2004 | Taguchi et al. .............. | 106/31.3 |
| 2004/0194660 A1* | 10/2004 | Taguchi et al. .......... | 106/31.43 |

FOREIGN PATENT DOCUMENTS

JP 2003-128953 A 8/2003

* cited by examiner

*Primary Examiner*—Helene Klemanski
(74) *Attorney, Agent, or Firm*—Sughrue Mion, PLLC

(57) ABSTRACT

An ink for ink jet recording which provides high-quality images excellent in weather fastnesses is provides, which is an ink for ink jet recording, comprising a yellow dye having a specific characteristic wherein the total amount of a cation other than a monovalent metal ion, a hydrogen ion, an ammonium ion, an organic quaternary nitrogen ion and an ion formed by proton addition to the nitrogen atom in basic organic material is not more than 0.5 wt % based on the amount of the ink.

7 Claims, No Drawings

INK FOR JET RECORDING AND INK SET

FIELD OF THE INVENTION

The present invention relates to an ink for ink jet recording capable of providing a high-quality image excellent in storage stability, and an ink set containing the ink.

BACKGROUND OF THE INVENTION

In recent years, with the widespread use of computers, ink jet printers have come into wide use for performing printing on paper, film, cloth, or the like not only in offices, but also at home.

The ink jet recording method is accomplished by the following system: a system in which droplets are ejected through the application of pressure by a piezoelectric element; a system in which droplets are ejected by thermally forming bubbles in an ink; an ultrasonic system; or a system in which droplets are attracted and ejected by an electrostatic force. As the ink compositions for such ink jet recording, water-based inks, oil-based inks, or solid (molten type) inks are used. Out of these inks, the water-based inks are mainstream in terms of production, handling property, odor, safety, and the like.

The colorants to be used for these inks for ink jet recording are required to have a high solubility in solvents, to be capable of high density recording, to be good in hue, to be excellent in fastnesses to light, heat, air, water, and chemicals, to be less likely to spread on an image-receiving material because of its good fixability thereon, to be excellent in storage stability as an ink, to have no toxicity, to have high purity, and further to be available at low cost. However, it is very difficult to seek colorants satisfying these requirements at high level.

Various dyes and pigments have already been proposed for use in ink jet, and have come into actual use. However, in actuality, colorants satisfying all the requirements have not yet been found. As for such conventionally well known dyes and pigments as those given color index (C. I.) numbers, it is difficult to make compatible the hue and the fastness required of the ink for ink jet recording. The study has been so far pursued on fast dyes having favorable hues, and the development of colorants excellent as colorants for ink jet has been pursued.

Yellow dyes for ink jet heretofore widely known are direct azo dyes, acid azo dyes, and the like.

C. I. Acid Yellow Nos. 17, 23, and 26 as the acid azo dyes, and C. I. Direct Yellow Nos. 86, 120, and 132, and the like as the direct azo dyes are used for ink jet yellow ink (e.g., JP-A-55-150396 and JP-A-2001-240781).

Further, the dyes more excellent in fastness than these dyes are also used as ink jet yellow inks (e.g., JP-A-2001-279145)

On the other hand, it has been shown that there are the following problems. Many of dyes are slightly water soluble, and tend to precipitate. Accordingly, such extraordinary printed portion as the portion in which the dye aggregates on a high-density printed portion (bronzed portion; the defective portion which has changed in film quality into mat form as compared to the normal printed portion) is formed upon printing, resulting in a deterioration in image quality. In particular, bronzing tends to occur at a multicolor mixed portion.

SUMMARY OF THE INVENTION

An object of the present invention is to provide an ink for ink jet recording, capable of providing an image having high image quality, and excellent in weather fastnesss such as light fastness, heat fastness, and ozone fastness, and an ink set thereof.

The object of the invention was achieved by the following yellow dye-containing inks for ink jet recording and an ink set of the following items.

1. An ink for ink jet recording, which comprises a dye having:

a $\lambda$max in an aqueous solution of from 390 nm to 470 nm; and a $I(\lambda max+70 \text{ nm})/I(\lambda max)$ ratio of not more than 0.4, in which $I(\lambda max)$ is the absorbance at $\lambda max$ and $I(\lambda max+70 \text{ nm})$ is the absorbance at $(\lambda max+70 \text{ nm})$, the dye being dissolved and/or dispersed in an aqueous medium, wherein the ink has a forced fading rate constant of not greater than $5.0\times10^{-2}$ [hour$^{-1}$], in which the forced fading rate constant is decided by printing the ink on a reflection type medium, thereafter measuring a reflection density through a Status A filter, specifying one point having a reflection density ($D_B$) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density, and the total amount of a cation in said ink except for a monovalent metal ion, a hydrogen ion, an ammonium ion, an organic quaternary nitrogen ion and an ion produced by the proton addition to a nitrogen atom in a basic organic material is 0.5 wt % or less.

2. The ink for ink jet recording according to the item 1, wherein the $\lambda$max in an aqueous solution of the dye is 390 nm to 470 nm, and the $I(\lambda max+70 \text{ nm})/I(\lambda max)$ ratio is not more than 0.2.

3. The ink for ink jet recording according to the item 1, wherein the oxidation potential of the dye is more noble than 1.0 V (vs SCE).

4. An ink for ink jet recording, which comprises a dye represented by the following formula (1), in which the dye has a $\lambda$max in an aqueous solution of 390 nm to 470 nm, and is dissolved and/or dispersed in an aqueous medium, wherein the total amount of a cation in said ink except for a monovalent metal ion, a hydrogen ion, an ammonium ion, an organic quaternary nitrogen ion and an ion produced by the proton addition to a nitrogen atom in a basic organic material is 0.5 wt % or less:

$$A-N=N-B \qquad (1)$$

wherein A and B each independently represents a heterocyclic group which may be substituted.

5. The ink for ink jet recording according to the item 1, which comprises a lithium ion.

6. The ink for ink jet recording according to the item 4, which comprises a lithium ion.

7. The ink for ink jet recording according to the item 1, wherein the cation in said ink except for a monovalent metal ion, a hydrogen ion, an ammonium ion, an organic quaternary nitrogen ion and an ion produced by the proton addition to a nitrogen atom in a basic organic material is at least one selected from the group consisting of magnesium ion, zinc ion, calcium ion, strontium ion, aluminum ion and a transition metal ion.

8. The ink for ink jet recording according to the item 4, wherein the cation in said ink except for a monovalent metal ion, a hydrogen ion, an ammonium ion, an organic quaternary nitrogen ion and an ion produced by the proton addition to a nitrogen atom in a basic organic material is at least one selected from the group consisting of magnesium ion, zinc ion, calcium ion, strontium ion, aluminum ion and a transition metal ion.

9. The ink for ink jet recording according to the item 4, wherein the dye represented by the formula (1) is at least one of dyes represented by the following formulae (2), (3) and (4):

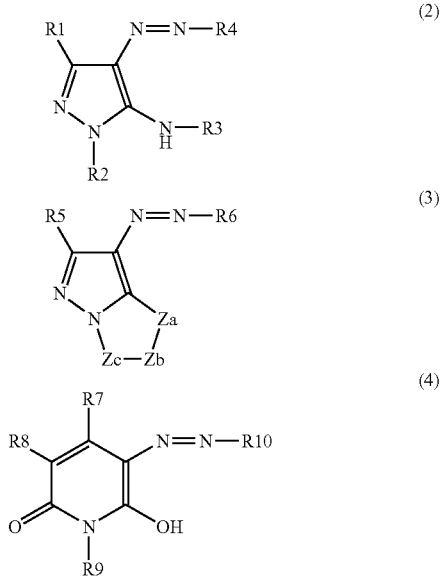

wherein R1 and R3 each represents a hydrogen atom, a cyano group, an alkyl group, a cycloalkyl group, an aralkyl group, an alkoxy group, an alkyl thio group, an aryl thio group, an aryl group, or an ionic hydrophilic group; R2 represents a hydrogen atom, an alkyl group, a cycloalkyl group, an aralkyl group, a carbamoyl group, an acyl group, an aryl group or a heterocyclic group;

R4 represents a heterocyclic group;

R5 represents a hydrogen atom, a cyano group, an alkyl group, a cycloalkyl group, an aralkyl group, an alkoxy group, an alkyl thio group, an aryl thio group, an aryl group or an ionic hydrophilic group; Za represents —N=, —NH— or —C(R11)=; Zb and Zc each independently represents —N= or —C(R11)=; R11 represents a hydrogen atom or a non-metal substituent; R6 represents a heterocyclic group, R7 and R9 each independently represents a hydrogen atom, a cyano group, an alkyl group, an a cycloalkyl group, aralkyl group, an aryl group, an alkyl thio group, an aryl thio group, an alkoxycarbonyl group, a carbamoyl group, or an ionichydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkyl thio group, an aryl thio group, an alkoxycarbonyl group, a carbamoyl group, a sulfamoyl group, an alkylsulfonyl group, an aryl sulfonyl group, an acyl group, an amino group, a hydroxy group or an ionic hydrophilic group; R10 represents a heterocyclic group.

10. An ink set comprising the ink for ink jet recording according to any one of the items 1 to 9.

DETAILED DESCRIPTION OF THE INVENTION

Below, the present invention will be described in details.

Preferred cations contained in an ink for ink jet recording of the invention are monovalent metal ions, a hydrogen ion, an ammonium ion, organic quaternary nitrogen ions, and ions formed by proton addition to the nitrogen atoms contained in basic organic matters (below, referred to as cations of the invention).

Examples of the monovalent metal ions may include lithium ion, potassium ion, sodium ion, and cesium ions.

Examples of the organic quaternary nitrogen ions may include tetramethyl ammonium ion, tetraethyl ammonium ion, tetrabutyl ammonium ion, benzyltrimethyl ammonium ion, benzyltributyl ammonium ion, cetylpyridinium ion, cetyltrimethyl ammonium ion, N,N'-dimethylpiperidinuim ion, and N,N'-dimethylimidazolium ion.

Examples of the nitrogen atoms in basic organic matters may include nitrogen atoms contained in trimethylamine, triethylamine, triethanolamine, methylamine, dimethylamine, butylamine, dibutylamine, piperidine, morpholine, piperazine, pyrrolidine, N-memthylpiperidine, N-methylmorpholine, pyridine, quinoline, pyrazine, pyrimidine, pyrazole, imidazole, and the like.

As the cation components contained in an ink, out of these, a hydrogen ion and a lithium ion capable of reducing the molecular weight are preferred, and a lithium ion is particularly preferred from the viewpoint of improving the water solubility of the dye having a dissociation group.

The ink of the invention is characterized in that the total content of cations other than those described above is not more than 0.5 wt % based on the amount of the ink.

Examples of the cations other than those described above may include magnesium ion, zinc ion, calcium ion, strontium ion, aluminum ion, and transition metal ions.

If the total content of these cations of the ink increases, precipitation in the ink or precipitation in the printed portion of the dye undesirably becomes likely to occur. Such being the case, the total content of these ions is required to be set at not more than 0.5 wt %, and more preferably not more than 0.1 wt %.

The ion components in the ink mainly derive from the counter ions to the ionic groups of dyes, additives such as surfactants, pH adjusters, and antiseptic agents. By appropriately selecting the kind and the amount of each of the counter ions of dyes and the additives, it is possible to adjust the cation amount.

A method for measuring an amount of a cation in the ink can use vairous conventional analytical methods, e.g., an ion chromatography method, an atomic absorption method, a plasma emission spectrometry method (ICP).

From the viewpoint of the fastness, particularly, fastness to ozone gas, the yellow dye to be used for the ink for ink jet recording of the invention is set as follows: the ink has a forced fading rate constant of not greater than $5.0 \times 10^{-2}$ [hour$^{-1}$] (preferably not more than $3.0 \times 10^{-2}$ [hour$^{-1}$], and more preferably not more than $1.0 \times 10^{-2}$ [hour$^{-1}$]), in which the forced fading rate constant is decided by printing the ink on a reflection type medium, thereafter measuring a reflection density through a Status A filter, specifying one point having a reflection density ($D_B$) in an yellow region of 0.90 to 1.10 as an initial density of the ink, forcedly fading the printed matter by use of an ozone fading tester that can regularly generate 5 ppm of ozone, and determining the time taken until the reflection density reaches 80% (residual ratio) of the initial density.

Herein, the reflection density is the value determined through a status A filter (blue) by means of a reflection densitometer (X-RITE 310TR). Whereas, the forced fading rate constant (k) is the value which can be determined from the residual ratio=exp(-kt), i.e., k=(-ln 0.8)/t.

Whereas, the yellow dyes are preferably the dyes having an oxidation potential more noble than 1.0 V (vs SCE), more preferably more noble than 1.1 V (vs SCE), and in particular preferably more noble than 1.2 V (vs SCE). As the kind of the dyes, azo dyes satisfying the foregoing physical property requirements are in particular preferred.

The value of the oxidation potential (Eox) can be determined with ease by those skilled in the art. This method is described in, for example, "New Instrumental Methods in Electrochemistry" written by P. Delahay (1954, published by Interscience Publisher Co.), "Electrochemical Methods" written by A. J. Bard et al., (1980, published by John Wiley & Sons Co.), and "Electrochemical Measuring Method" written by Akira Fujishima, et al., (1984, published by GIHODO Publisher's Co.).

Specifically, the oxidation potential is determined in the following manner. In a solvent such as dimethylformamide or acetonitrile containing a supporting electrolyte such as sodium perchlorate or tetrapropylammonium perchlorate, a test sample is dissolved in an amount of $1\times10^{-4}$ to $1\times10^{-6}$ mol/l. The oxidation potential is determined as the value with respect to SCE (saturated calomel electrode) using cyclic voltanmetry or direct current polarography. This value may deviate by about several tens millivolts under the influences of the liquid junction potential and the liquid resistance of the sample solution, and the like. However, the addition of a reference sample (e.g., hydroquinone) can ensure the reproducibility of the potential.

Incidentally, in order to uniquely define the potential, in the invention, the value (vs SCE) determined by direct current polarography in dimethylformamide containing tetrapropyl ammonium perchlorate in an amount of 0.1 moldm$^{-3}$ (the concentration of the dye is 0.001 moldm$^{-3}$) as a supporting electrolyte is taken as the oxidation potential of the dye.

The value of Eox denotes the ease of transfer of electrons from the sample to the electrode. The larger value (the more noble oxidation potential) denotes the less liability for electrons to transfer from the sample to the electrode, in other words, the lower susceptibility to oxidation. In terms of the structure of the compound, the oxidation potential becomes more noble by introducing an electron withdrawing group, and the oxidation potential becomes more basic by introducing an electron donating group. In the invention, in order to reduce the reactivity with ozone which is an electrophilic reagent, it is desirable that the oxidation potential is made more noble by introducing an electron withdrawing group in the yellow dye skeleton.

Whereas, the dye for use in the invention is preferably favorable in fastness and favorable in hue, and in particular, preferably shows a sharp tail on the longer wavelength side in the absorption spectrum. For this reason, a yellow dye preferably has a λmax in an aqueous solution of from 390 nm to 470 nm, and a I(λmax+70 nm)/I(λmax) ratio of the absorbance I(λmax+70 nm) at (λmax+70 nm) to the absorbance I(λmax) at λmax of not more than 0.2, and more preferably not more than 0.1. The lower limit of the ratio is ideally 0, however, it is realistically about 0.01.

As the dyes satisfying such an oxidation potential and absorption characteristic, preferred are the ones represented by the following formula (1). However, any compound represented by the formula (1) is acceptable so long as it has a λmax of from 390 nm to 470 nm. It is not necessarily required to satisfy the foregoing oxidation potential and I(λmax+70 nm)/I(λmax) ratio.

A-N=N-B                                     Formula (1)

where A and B each independently represents a heterocyclic group which may be substituted.

As the heterocycle, a heterocycle comprising a 5-membered ring or a 6-membered ring is preferred. It may have either a monocyclic structure or a polycyclic structure in which not less than two rings are condensed, and may be an aromatic heterocycle or a non-aromatic heterocycle. Preferred hetero atoms constituting the heterocycles are N, O, S atoms.

In the formula (1), as the heterocycles represented by A, preferred are 5-pyrazolone, pyrazole, triazole, oxazolone, isooxazolone, barbituric acid, pyridone, pyridine, rhodanine, pyrazolidinedione, pyrazolopyridone, and Meldrum's acid, and condensed heterocycles obtained by further annelating hydrocarbon aromatic rings or heterocycles to these heterocycles. Among them, 5-pyrazolone, 5-aminopyrazole, pyridone, 2,6-diaminopyridine, and pyrazoloazoles are preferred, and 5-aminopyrazole, 2-hydroxy-6-pyridone, and pyrazolotriazole are particularly preferred.

As the heterocycles represented by B, mention may be made of pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzoimidazole, triazole, oxazole, isoxazole, benzoxazole, thiazole, benzothiazole, isothiazole, benzoisothiazole, thiadiazole, benzoisoxazole, pyrrolidine, piperidine, piperazine, imidazolidine, thiazoline, and the like. Among them, pyridine, quinoline, thiophene, benzothiphene, pyrazole, imidazole, benzimidazole, triazole, oxazole, isoxazole, benzoxazole, thiazole, benzothiazole, isothiazole, benzoisothiazole, thiadiazole, and benzisoxazole are preferred. Quinoline, thiophene, pyrazole, thiazole, benzoxazole, benzisoxazole, isothiazole, imidazole, benzothiazole, and thiadiazole are more preferred. Pyrazole, benzothiazole, benzoxazole, imidazole, 1,2,4-thiadiazole, and 1,3,4-thiadiazole are particularly preferred.

Examples of the substituents which replace A and B may include: a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclicoxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, alkyl and aryl sulfonylamino groups, a mercapto group, an alkyl thio group, an aryl thio group, a heterocyclic thio group, a sulfamoyl group, alkyl and aryl sulfinyl groups, alkyl and aryl sulfonyl groups, an acyl group, an aryloxycarbonyl group, an alkoxycarbonyl group, a carbamoyl group, an imide group, a phosphino group, a phosphinyl group, a phosphinyloxy group, a phosphinylamino group, a silyl group, and an ionic hydrophilic group.

When the dye of the formula (1) is used as a water soluble dye, it preferably has at least one ionic hydrophilic group in the molecule. Examples of the ionic hydrophilic group include a sulfo group, a carboxyl group, a phosphono group, and a quaternary ammonium group. The ionic hydrophilic groups are preferably a carboxyl group, a phosphono group, and a sulfo group, and in particular preferably a carboxyl group and a sulfo group. The carboxyl group, the phosphono group, and the sulfo group may also be each in a state of a salt. Examples of a counter ion that forms the salt include an ammonium ion, alkali metal ions (e.g., a lithium ion, a sodium ion, and a potassium ion), and organic cations (e.g., a tetramethylammonium ion, a tetramethylguanidium ion, and a tetrametylphosphonium ion). Out of the counter ions, alkali metal ions, and particularly, a lithium ion are preferred.

Out of the dyes represented by the formula (1), the dyes of the formulae (2), (3), and (4) are preferred. Formula (2)

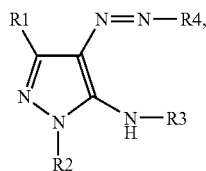

In the formula (2), R1 and R3 each represents a hydrogen atom, a cyano group, an alkyl group, a cycloalkyl group, an aralkyl group, an alkoxy group, an alkyl thio group, an aryl thio group, an aryl group, or an ionic hydrophilic group, R2 represents a hydrogen atom, an alkyl group, a cycloalkyl group, an aralkyl group, a carbamoyl group, an acyl group, an aryl group, or a heterocyclic group, and R4 represents a heterocyclic group. Formula (3)

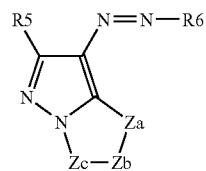

In the formula (3), R5 denotes a hydrogen atom, a cyano group, an alkyl group, a cycloalkyl group, an aralkyl group, an alkoxy group, an alkyl thio group, an aryl thio group, an aryl group, or an ionic hydrophilic group, Za represents —N=, —NH—, or —C(R11)=, Zb and Zc each independently represents —N= or —C(R11)=, R11 represents a hydrogen atom or a non-metal substituent, and R6 denotes a heterocyclic group. Formula (4)

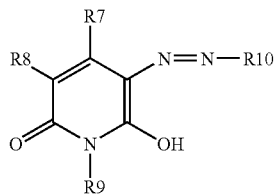

In the formula (4), R7 and R9 each independently represents a hydrogen atom, a cyano group, an alkyl group, an a cycloalkyl group, aralkyl group, an aryl group, an alkyl thio group, an aryl thio group, an alkoxycarbonyl group, a carbamoyl group, or an ionic hydrophilic group, R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, an alkylsulfonyl group, an aryl sulfonyl group, an acyl group, an amino group, a hydroxy group, or an ionic hydrophilic group, and R10 represents a heterocyclic group.

In the formulae (2), (3), and (4), the alkyl groups represented by R1, R2, R3, R5, R7, R8, and R9 include alkyl groups having substituents, and unsubstituted alkyl groups. The alkyl groups are preferably alkyl groups each having 1 to 20 carbon atoms. Examples of the substituents may include a hydroxyl group, an alkoxy group, a cyano group, a halogen atom, and an ionic hydrophilic group. Examples of the alkyl groups may include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl groups represented by R1, R2, R3, R5, R7, R8, and R9 include cycloalkyl groups having substituents, and unsubstituted cycloalkyl groups. The cycloalkyl groups are preferably cycloalkyl groups each having 5 to 12 carbon atoms. Examples of the substituents may include ionic hydrophilic groups. Examples of the cycloalkyl groups may include a cyclohexyl group.

The aralkyl groups represented by R1, R2, R3, R5, R7, R8, and R9 include aralkyl groups having substituents, and unsubstituted aralkyl groups. The aralkyl groups are preferably aralkyl groups each having 7 to 20 carbon atoms. Examples of the substituents may include ionic hydrophilic groups. Examples of the aralkyl groups may include benzyl and 2-phenetyl.

The aryl groups represented by R1, R2, R3, R5, R7, R8, and R9 include aryl groups having substituents, and unsubstituted aryl groups. The aryl groups are preferably aryl groups each having 6 to 20 carbon atoms. Examples of the substituents may include an alkyl group, an alkoxy group, a halogen atom, an alkylamino group, and ionic hydrophilic groups. Examples of the aryl groups may include phenyl, p-tolyl, p-methoxyphenyl, o-chlorophenyl, and m-(3-sulfoproprylamino)phenyl.

The alkyl thio groups represented by R1, R2, R3, R5, R7, R8, and R9 include alkyl thio groups having substituents, and unsubstituted alkyl thio groups. The alkyl thio groups are preferably alkyl thio groups each having 1 to 20 carbon atoms. Examples of the substituents may include ionic hydrophilic groups. Examples of the alkyl thio groups may include methyl thio and ethyl thio.

The aryl thio groups represented by R1, R2, R3, R5, R7, R8, and R9 include aryl thio groups having substituents, and unsubstituted aryl thio groups. The aryl thio groups are preferably aryl thio groups each having 6 to 20 carbon atoms. Examples of the substituents may include alkyl groups and ionic hydrophilic groups. Examples of the aryl thio groups may include a phenyl thio group and p-tolyl thio.

The heterocyclic groups represented by R2 and $R^{22}$ described later are preferably 5-membered or 6-membered heterocycles, which may also be further annelated. The hetero atoms constituting the heterocycles are preferably N, S, and O. Further, they may also be aromatic heterocycles or non-aromatic heterocycles. The heterocycles may also be further substituted. Examples of the substituent may include the same ones as the substituents of an aryl group described later. Preferred heterocycles are 6-membered nitrogen-containing aromatic heterocycles. In particular, preferred examples thereof may include triazine, pyrimidine, and phthalazine.

As the halogen atoms represented by R8, mention may be made of a fluorine atom, a chlorine atom, and a bromine atom.

The alkoxy groups represented by R1, R3, R5, and R8 include alkoxy groups having substituents, and unsubstituted alkoxy groups. The alkoxy groups are preferably alkoxy groups each having 1 to 20 carbon atoms. Examples of the substituents may include a hydroxyl group and ionic hydrophilic groups. Examples of the alkoxy groups may include methoxy, ethoxy, isopropoxy, methoxyethoxy, hydroxyethoxy, and 3-carboxypropoxy.

The aryloxy groups represented by R8 include aryloxy groups having substituents, and unsubstituted aryloxy groups. The aryloxy groups are preferably aryloxy groups each having 6 to 20 carbon atoms. Examples of the substituents may include an alkoxy group and ionic hydrophilic groups. Examples of the aryloxy groups may include phenoxy, p-methoxyphenoxy, and o-methoxyphenoxy.

The acylamino groups represented by R8 include acylamino groups having substituents, and unsubstituted acylamino groups. The acylamino groups are preferably acylamino groups each having 2 to 20 carbon atoms. Examples of the substituents may include ionic hydrophilic groups. Examples of the acylamino groups may include acetamide, propionamide, benzamide, and 3,5-disulfobenzamide.

The sulfonylamino groups represented by R8 include sulfonylamino groups having substituents, and unsubstituted sulfonylamino groups. The sulfonylamino groups are preferably sulfonylamino groups each having 1 to 20 carbon atoms. Examples of the sulfonylamino groups may include methylsulfonylamino, and ethylsulfonylamino.

The alkoxycarbonylamino groups represented by R8 include alkoxycarbonylamino groups having substituents, and unsubstituted alkoxycarbonylamino groups. The alkoxycarbonylamino groups are preferably alkoxycarbonylamino groups each having 2 to 20 carbon atoms. Examples of the substituents may include ionic hydrophilic groups. Examples of the alkoxycarbonylamino groups may include ethoxycarbonylamino.

The ureido groups represented by R8 include ureido groups having substituents, and unsubstituted ureido groups. The ureido groups are preferably ureido groups each having 1 to 20 carbon atoms. Examples of the substituents may include an alkyl group and an aryl group. Examples of the ureido groups may include 3-methylureido, 3,3-dimethyluleido, and 3-phenylureido.

The alkoxycarbonyl groups represented by R7, R8, and R9 include alkoxycarbonyl groups having substituents, and unsubstituted alkoxycarbonyl groups. The alkoxycarbonyl groups are preferably alkoxycarbonyl groups each having 2 to 20 carbon atoms. Examples of the substituents may include ionic hydrophilic groups. Examples of the alkoxycarbonyl groups may include methoxycarbonyl and ethoxycarbonyl.

The carbamoyl groups represented by R2, R7, R8, and R9 include carbamoyl groups having substituents, and unsubstituted carbamoyl groups. Examples of the substituents may include an alkyl group. Examples of the carbamoyl groups may include a methylcarbamoyl group and a dimethylcarbamoyl group.

The sulfamoyl groups represented by R8 include sulfamoyl groups having substituents, and unsubstituted sulfamoyl groups. Examples of the substituents may include an alkyl group. Examples of the sulfamoyl groups may include a dimethylsulfamoyl group and di-(2-hydroxyethyl)sulfamoyl group.

Examples of alkylsulfonyl and arylsulfonyl groups represented by R8 include methylsulfonyl and phenylsulfonyl.

The acyl groups represented by R2 and R8 include acyl groups having substituents, and unsubstituted acyl groups. The acyl groups are preferably acyl groups each having 1 to 20 carbon atoms. Examples of the substituents may include ionic hydrophilic groups. Examples of the acyl groups may include acetyl and benzoyl.

The amino groups represented by R8 include amino groups having substituents, and unsubstituted amino groups. Examples of the substituents may include an alkyl group, an aryl group, and a heterocyclic group. Examples of the amino groups may include methylamino, diethylamino, anilino, and 2-chloroanilino.

The heterocyclic groups represented by R4, R6, and R10 are the same as the heterocyclic groups which may be substituted represented by B of the formula (1). Preferred examples, more preferred example, and particularly preferred examples thereof are also the same as those described previously. Examples of the substituents include ionic hydrophilic groups, an alkyl group having 1 to 12 carbon atoms, an aryl group, an alkyl or aryl thio group, a halogen atom, a cyano group, a sulfamoyl group, a sulfonamino group, a carbamoyl group, and an acylamino group. The alkyl group, aryl group, and the like may also have other substituents.

In the formula (3), Za represents —N=, —NH—, or —C(R11)=, Zb and Zc each independently represents —N= or —C(R11)=, and R11 represents a hydrogen atom or a non-metal substituent. The non-metal substituent represented by R11 is preferably a cyano group, a cycloalkyl group, an aralkyl group, an aryl group, an alkyl thio group, an aryl thio group, or an ionic hydrophilic group. The respective substituents are equivalent to the respective substituents represented by R1, and the same goes for the preferred examples. Examples of the skeleton of the heterocycle comprising two 5-membered rings included in the formula (3) are shown below.

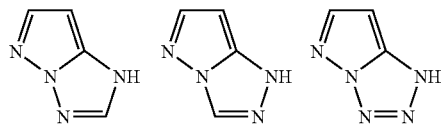

Examples of the substituents in the foregoing case where the substituents may have other substituents may include the substituents which may replace the heterocycles A and B of the formula (1) previously described.

When the dyes represented by the formulae (2) to (4) are used as water soluble dyes, each of the dyes preferably has at least one ionic hydrophilic group in the molecule. Such dyes include the dyes represented by the formulae (2) to (4) where at least any of R1, R2, R3, R5, R7, R8, and R9 is an ionic hydrophilic group, and in addition, the dyes represented by the formulae (2) to (4), where R1 to R11 each further has an ionic hydrophilic group as a substituent.

Out of the formulae (2), (3), and (4), the formula (2) is preferred. Especially, the one represented by the following formula (2-1) is particularly preferred.

Formula (2-1)

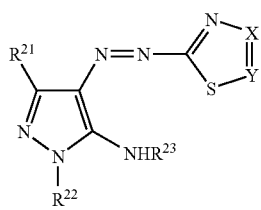

In the formula (2-1), $R^{21}$ and $R^{23}$ each represents a hydrogen atom, an alkyl group, a cycloalkyl group, an aralkyl group, an alkoxy group, or an aryl group. $R^{22}$ represents an aryl group or a heterocyclic group. Of X and Y, the one represents a nitrogen atom, and the other represents —$CR^{24}$. $R^{24}$ represents a hydrogen atom, a halogen atom, a cyano group, an alkyl group, an alkyl thio group, an alkylsulfonyl group, an alkylsulfinyl group, an alkyloxycarbonyl group, a carbamoyl group, an alkoxy group, an aryl group, an aryl thio group, an arylsulfonyl group, an arylsulfinyl group, an aryloxy group, or an acylamino group. Each substituent thereof may also be further substituted.

The dyes of the formula (2-1), having an ionic hydrophilic group is preferred.

Below, specific examples of preferred dyes for used in the invention will be shown. However, the dyes for use in the invention is not limited to the following specific examples. These compounds can be synthesized by reference to JP-A Nos. 2-24191 and 13-279145, and Japanese Patent Application No. 2000-124832.

Further, the following specific examples include a large number of examples in which a sodium ion is employed as the counter ion of the ionic hydrophilic group. However, the counter ion is not limited thereto, and it can be prepared for synthesis, to be a given ion.

YI-1

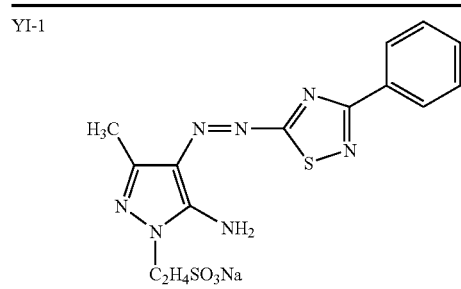

YI-2

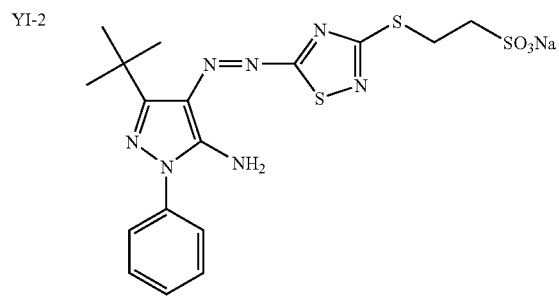

YI-3

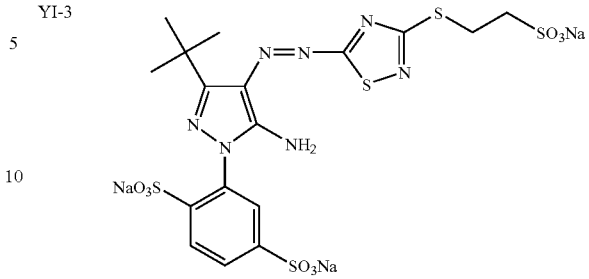

YI-4

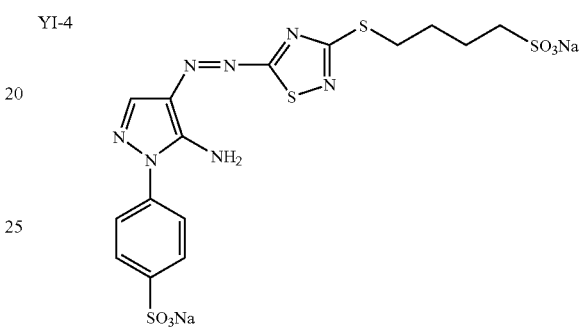

YI-5

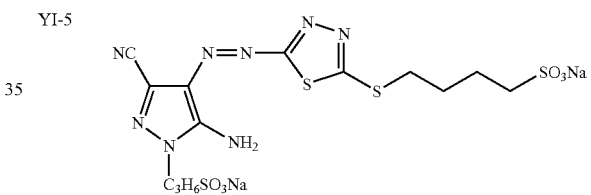

YI-6

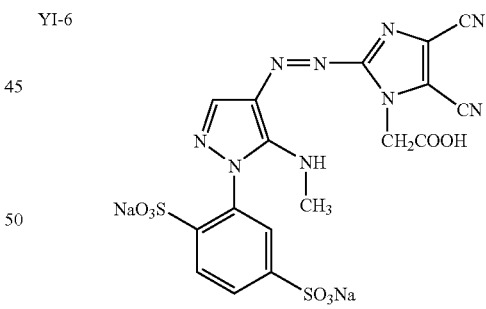

YI-7

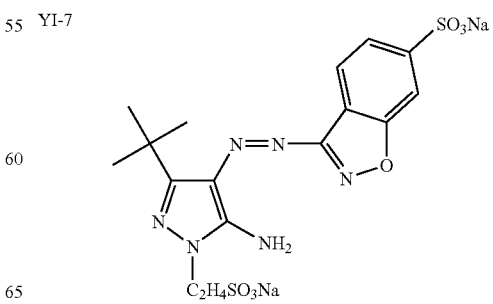

-continued
YI-8
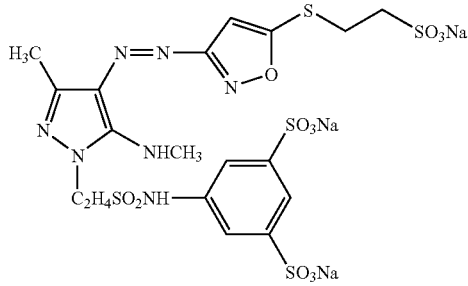
YI-9
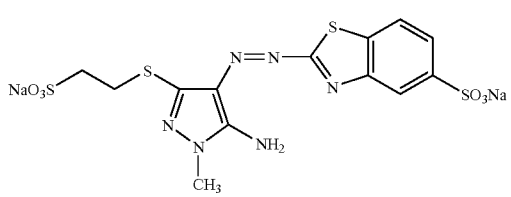
YI-10
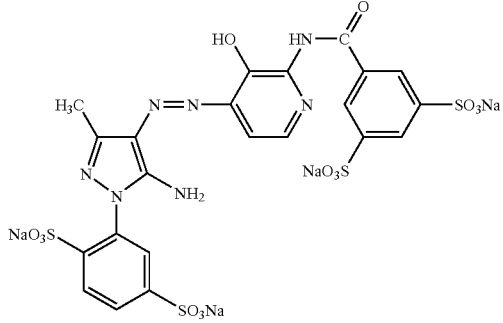
YI-11
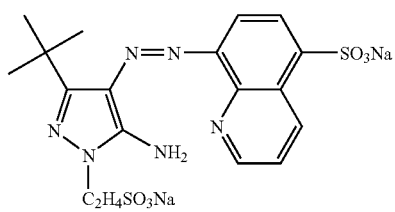
YI-12
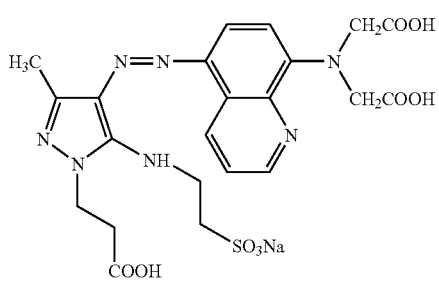
YI-13
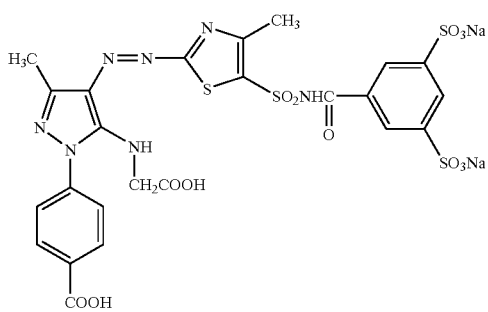
-continued
YI-14
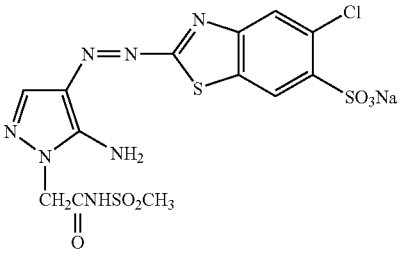
YI-15
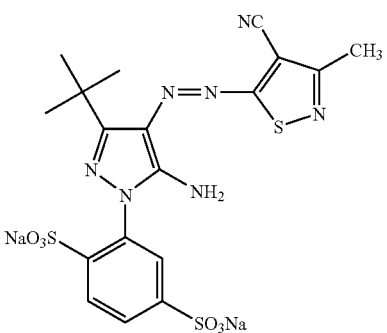
YI-16
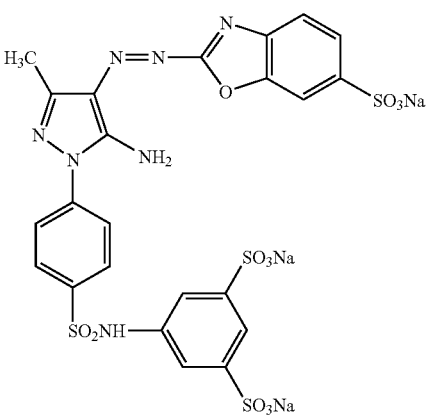
YI-17
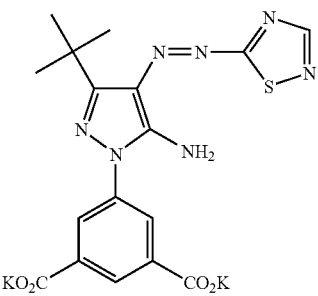

-continued
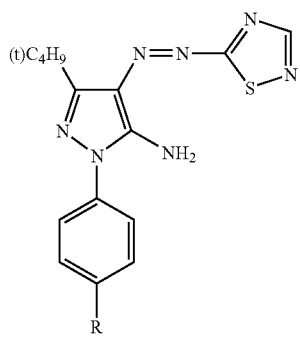
| | R |
|---|---|
| YI-18 | CH₃ |
| YI-19 | C₃H₆SO₃Na |
| YI-20 | H |
| YI-21 | C₂H₄CN |
| YI-22 | 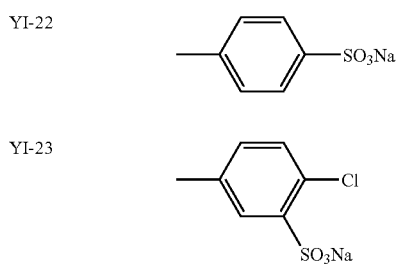 |
| YI-23 | |
| YI-24 | |
| YI-25 | 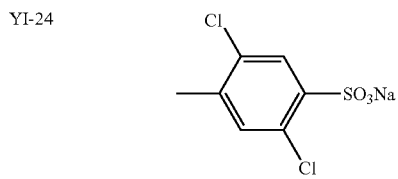 |
| YI-26 | 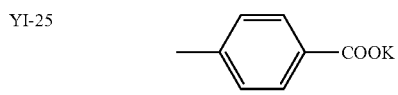 |
| YI-27 | 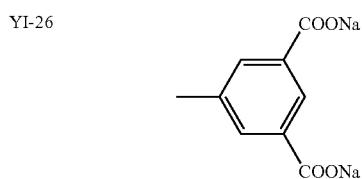 |
-continued
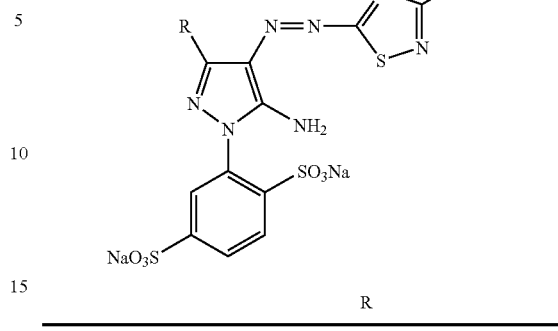
| | R |
|---|---|
| YI-28 | CH₃ |
| YI-29 | 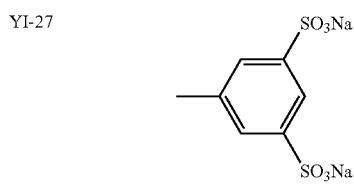 |
| YI-30 | OC₂H₅ |
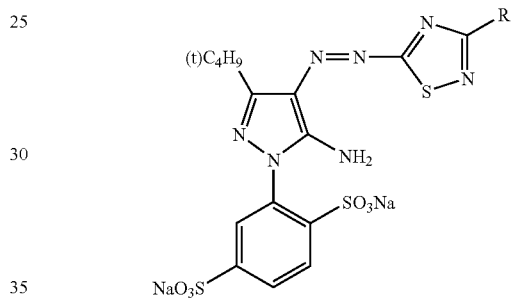
| | R |
|---|---|
| YI-31 | (phenyl) |
| YI-32 | CH₃ |
| YI-33 | SC₂H₄SO₃Na |
| YI-34 | SO₂C₂H₄SO₃Na |
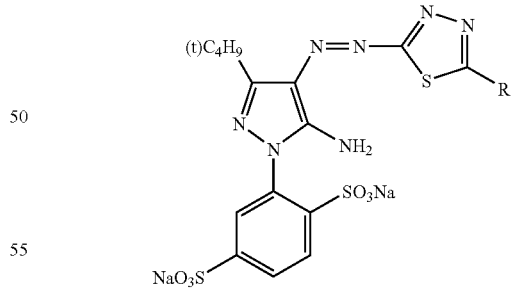
| | R |
|---|---|
| YI-35 | H |
| YI-36 | CH₃ |
| YI-37 | (phenyl) |

-continued
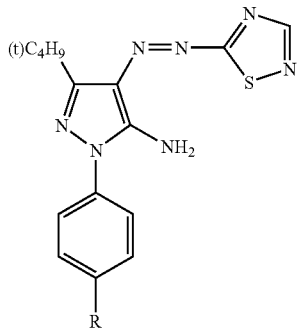
| | R |
|---|---|
| YI-38 | COOC$_4$H$_9$ |
| YI-39 | CON(C$_4$H$_9$)$_2$ |
| YI-40 | SO$_2$NHC$_{12}$H$_{25}$ |
| YI-41 | OC$_8$H$_{17}$ |
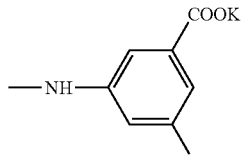
| | R | R' |
|---|---|---|
| YI-42 | CON(C$_4$H$_9$)$_2$ | H |
| YI-43 | COOC$_8$H$_{17}$ | H |
| YI-44 | CON(C$_4$H$_9$)$_2$ | 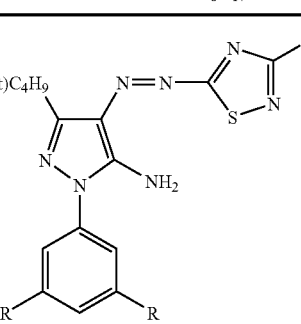 |
| YI-45 | CON(C$_4$H$_9$)$_2$ | CH$_3$ |
| YI-46 | H | 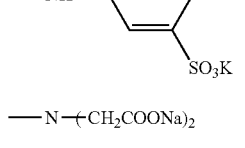 |
| YI-47 | H | SC$_8$H$_{17}$ |
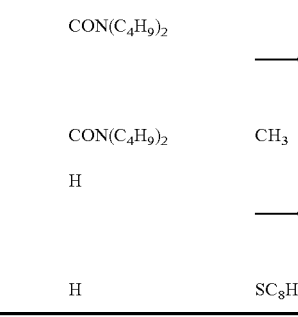
| | R |
|---|---|
| YI-48 | —NHC$_2$H$_4$COOK |
| YI-49 | —NHC$_2$H$_4$SO$_3$Na |
-continued
| YI-50 | 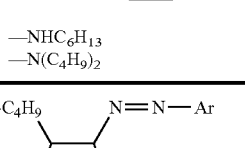 |
|---|---|
| YI-51 | |
| YI-52 | |
| YI-53 | —N—(CH$_2$COONa)$_2$ |
| YI-54 | |
| YI-55 | |
| YI-56 | —NHC$_6$H$_{13}$ |
| YI-57 | —N(C$_4$H$_9$)$_2$ |
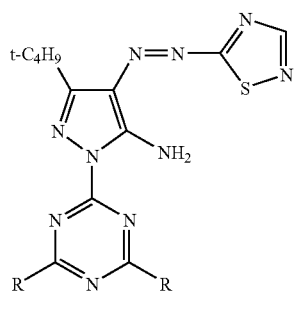
| | Ar |
|---|---|
| YI-58 | 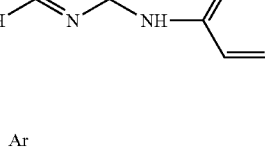 |
| YI-59 | |

-continued
| | |
|---|---|
| YI-60 | 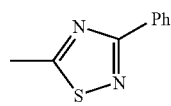 |
| YI-61 | 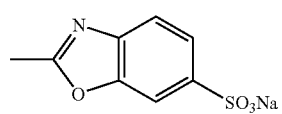 |
| YI-62 | 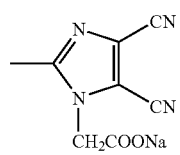 |
| YI-63 | 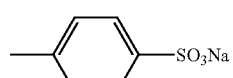 |
| YI-64 | 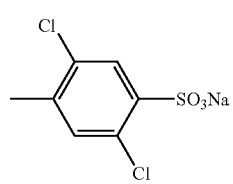 |
| YI-65 | 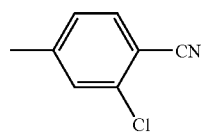 |
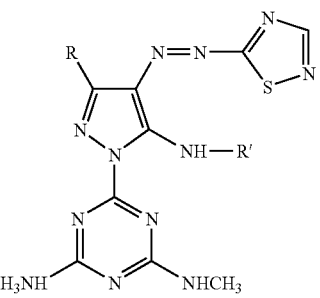
| | R | R' |
|---|---|---|
| YI-66 | Ph | H |
| YI-67 | $OC_2H_5$ | $C_2H_5$ |
| YI-68 | $CH_3$ | H |
| YI-69 | $t\text{-}C_4H_9$ | H |
| YI-70 | $t\text{-}C_4H_9$ | $-C_2H_4COOH$ |
Dye YI-71
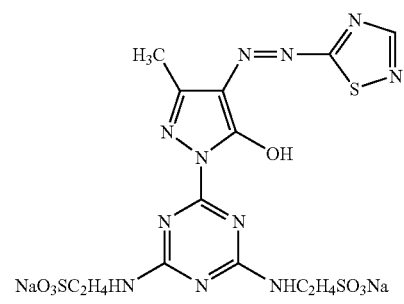
-continued
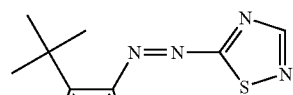
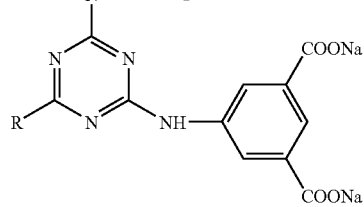
| | R |
|---|---|
| YI-72 | H |
| YI-73 | $OCH_3$ |
| YI-74 | OH |
| YI-75 | $SO_3Na$ |
| YI-76 | F |
| YI-77 | 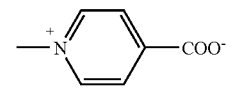 |
|---|---|
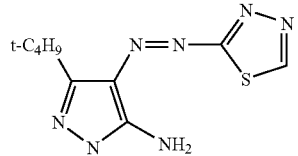
| | $R^1$ | $R^2$ | $R^3$ |
|---|---|---|---|
| YI-78 | Cl | Cl | Cl |
| YI-79 | Cl | Cl | F |
| YI-80 | Cl | $-CONHPh$ | Cl |
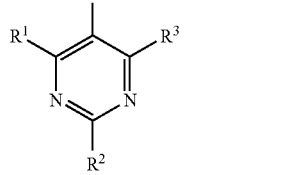
| | $R^1$ | $R^2$ | $R^3$ |
|---|---|---|---|
| YI-81 | F | H | H |
| YI-82 | Cl | H | F |

-continued

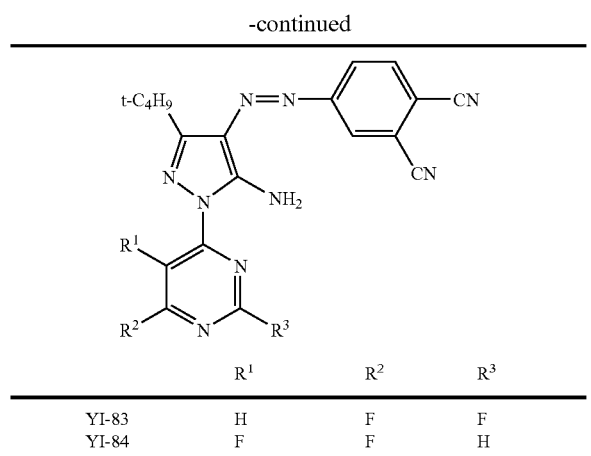

| | R¹ | R² | R³ |
|---|---|---|---|
| YI-83 | H | F | F |
| YI-84 | F | F | H |

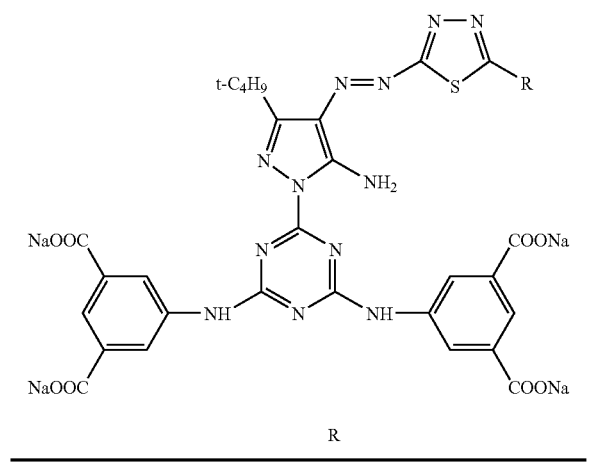

| | R |
|---|---|
| YI-85 | H |
| YI-86 | CH₃ |
| YI-87 | Ph |
| YI-88 | SCH₂COONa |
| YI-89 | SC₂H₅ |
| YI-90 | SC₄H₉-n |
| YI-91 | SCH₂CHMe₂ |
| YI-92 | SCHMeEt |
| YI-93 | SC₄H₉-t |
| YI-94 | SC₇H₁₅-n |
| YI-95 | SC₂H₄OC₂H₅ |
| YI-96 | SC₂H₄OC₄H₉-n |
| YI-97 | SCH₂CF₃ |

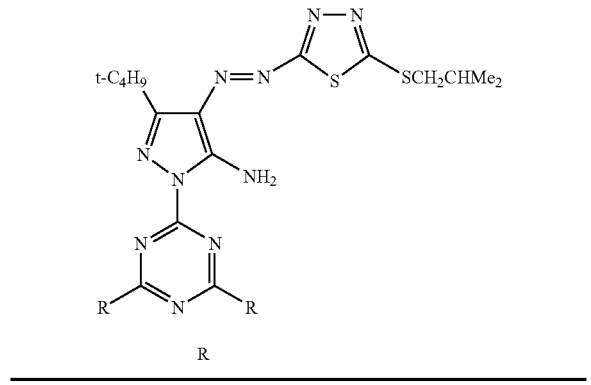

| | |
|---|---|
| YI-98 | —NHC₂H₄COOK |
| YI-99 | —NHC₂H₄SO₃Na |

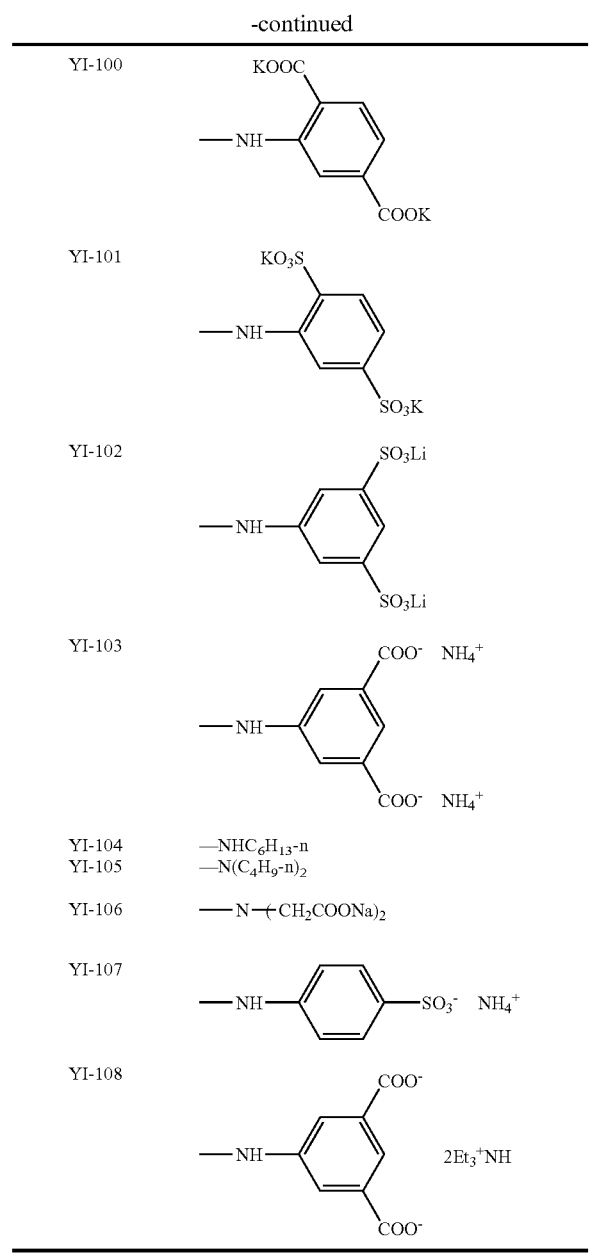

| | |
|---|---|
| YI-104 | —NHC₆H₁₃-n |
| YI-105 | —N(C₄H₉-n)₂ |

The ink for ink jet recording of the invention contains the yellow dye of the invention in an amount of, preferably, 0.2 to 20 wt %, and more preferably 0.5 to 15 wt %.

The ink set of the invention contains at least one of the inks for ink jet recording described above. The ink set of the invention contains the ink of the invention in which the cation components have been adjusted as described above. As a result, at the multicolor mixed portion of the resulting recorded image, it is also excellent in weather fastness, which enables the prevention of occurrence of bronzing gloss.

For the ink of the invention, other dyes may also be used in combination with the yellow dye of the invention in order to adjust the hue for obtaining a full color image. As examples of the dye usable in combination, mention may be made of the following ones.

Examples of the yellow dye may include: aryl or heteryl azo dyes having phenols, naphthols, anilines, pyrazolones, pyridones or open-chain active methylene compounds as coupling components; azomethine dyes having open-chain active methylene compounds as coupling components; methine dyes such as benzylidene dyes and monomethineoxonol dyes; and quinone dyes such as naphthoquinone dyes and anthraquinone dyes. As dye species other than these dyes, mention may be made of quinophthalone dyes, nitro-nitroso dyes, acridine dyes, acridinone dyes, and the like. These dyes may also be the ones which do not turn yellow until parts of chromophores dissociate. In that case, counter cations may be inorganic cations such as alkali metal ions and ammonium ions, or organic cations such as pyridinium ions and quaternary ammonium salt ions, or polymer cations having them as partial structures.

Examples of magenta dyes may include: aryl or heteryl azo dyes having phenols, naphthols or anilines as coupling components; azomethine dyes having pyrazolones or pyrazolotriazoles as coupling components; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinone, anthraquinone, and anthrapyridone dyes; and condensation polycyclic dyes such as dioxazine dyes. These dyes may be the ones which do not turn magenta until parts of chromophores dissociate. In that case, counter cations may be inorganic cations such as alkali metal ions and ammonium ions, or organic cations such as pyridinium ions and quaternary ammonium salt ions, or polymer cations having them as partial structures.

Examples of cyan dyes may include: azomethine dyes such as indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having, for example, phenols, naphthols or anilines as coupling components; and indigo-thioindigo dyes. These dyes may be the ones which do not turn cyan until parts of chromophores dissociate. In that case, counter cations may be inorganic cations such as alkali metal ions and ammonium ions, or organic cations such as pyridinium ions and quaternary ammonium salt ions, or polymer cations having them as partial structures.

Whereas, black dyes such as polyazo dyes can also be used.

Further, water soluble dyes such as direct dyes, acidic dyes, food dyes, basic dyes, and reactive dyes can also be used in combination. Among these, preferred examples thereof may include:

C.I. Direct Red Nos. 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247;

C.I. Direct Violet Nos. 7, 9, 47, 48, 51, 66, 90, 93, 94, 95, 98, 100, and 101;

C.I. Direct Yellow Nos. 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blue Nos. 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291;

C.I. Direct Black Nos. 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199;

C.I. Acid Red Nos. 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397;

C.I. Acid Violet Nos. 5, 34, 43, 47, 48, 90, 103, and 126;

C.I. Acid Yellow Nos. 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326;

C.I. Acid Black Nos. 7, 24, 29, 48, 52:1 and 172;

C.I. Reactive Red Nos. 3, 13, 17, 19, 21, 22, 23, 24, 29, 35, 37, 40, 41, 43, 45, 49, and 55;

C.I. Reactive Violet Nos. 1, 3, 4, 5, 6, 7, 8, 9, 16, 17, 22, 23, 24, 26, 27, 33, and 34;

C.I. Reactive Yellow Nos. 2, 3, 13, 14, 15, 17, 18, 23, 24, 25, 26, 27, 29, 35, 37, 41, and 42;

C.I. Reactive Blue Nos. 2, 3, 5, 8, 10, 13, 14, 15, 17, 18, 19, 21, 25, 26, 27, 28, 29, and 38;

C.I. Reactive Black Nos. 4, 5, 8, 14, 21, 23, 26, 31, 32, and 34;

C.I. Basic Red Nos. 12, 13, 14, 15, 18, 22, 23, 24, 25, 27, 29, 35, 36, 38, 39, 45, and 46;

C.I. Basic Violet Nos. 1, 2, 3, 7, 10, 15, 16, 20, 21, 25, 27, 28, 35, 37, 39, 40, and 48;

C.I. Basic Yellow Nos. 1, 2, 4, 11, 13, 14, 15, 19, 21, 23, 24, 25, 28, 29, 32, 36, 39, and 40;

C.I. Basic Blue Nos. 1, 3, 5, 7, 9, 22, 26, 41, 45, 46, 47, 54, 57, 60, 62, 65, 66, 69, and 71; and C.I. Basic Black No. 8.

Further, a pigment can also be used in combination.

As the pigment usable for the ink of the invention, there may be used known pigments described in various references other than commercially available ones. Examples of these references include: Color Index (edited by The Society of Dyers and Colourists), "Revised New Edition of Handbook of Pigments", edited by Japan Society of Pigment Technology (published in 1989), "Latest Pigment Application Technology", CMC Publishing Co., Ltd., (published in 1986), "Printing Ink Technology", CMC Publishing Co., Ltd., (published in 1984), and, "Industrial Organic Pigments", written jointly by W. Herbst and K. Hunger (VCH Verlagsgesellschaft, published in 1993). Specifically, as organic pigments, mention may be made of azo pigments (azo lake pigment, insoluble azo pigment, condensed azo pigment, and chelate azo pigment), polycyclic pigments (phthalocyanine pigment, anthraquinone pigment, perylene and perynone pigments, indigo pigment, quinacridone pigment, dioxazine pigment, isoindolinone pigment, quinophthalone pigment, and diketopyrolopyrrole pigment), dyed lake pigment (acidic or basic dye lake pigment), and azine pigment. As inorganic pigments, mention may be made of yellow pigments such as C.I. Pigment Yellow Nos. 34, 37, 42, and 53, red pigments such as C.I. Pigment Red Nos. 101 and 108, blue pigments such as C.I. Pigment Blue Nos. 27, 29, and 17:1, black pigments such as C.I. Pigment Black No. 7 and magnetite, white pigments such as C.I. Pigment White Nos. 4, 6, 18, and 21, and the like.

As the pigments having a color tone preferable for image formation, of blue or cyan pigments, preferred are phthalocyanine pigments, anthraquinone indanthrone pigments (such as C.I. Pigment Blue No. 60), and dyed lake pigment-based triaryl carbonium pigments, and in particular preferred are phthalocyanine pigments (preferred examples of which include copper phthalocyanines such as C.I. Pigment Blue Nos. 15:1, 15:2, 15:3, 15:4, and 15:6, monochloro or low-chlorinated copper phthalocyanines, the pigments described in EP-A No. 860,475 for aluminumphthalocyanines, metal-free phthalocyanine of C.I. Pigment Blue No. 16, and phthalocyanines comprising Zn, Ni, or Ti as a central metal, and especially preferred examples of which include C.I. Pigment Blue Nos. 15:3 and 15:4, and aluminum phthalocyanine).

The red or purple pigments to be preferably used are: azo pigments (preferred examples of which include C.I. Pigment Red Nos. 3, 5, 11, 22, 38, 48:1, 48:2, 48:3, 48:4, 49:1, 52:1, 53:1, 57:1, 63:2, 144, 146, and 184, and the like, and especially preferred ones of which are C.I. Pigment Red Nos. 57:1, 146, and 184), quinacridone pigments (preferred examples of which include C.I. Pigment Red Nos. 122, 192, 202, 207, and 209, and C.I. Pigment Violet Nos. 19 and 42, and especially preferred one of which is C.I. Pigment Red No. 122), dyed lake pigment-based triaryl carbonium pigments (preferred examples of which include xanthene series C.I. Pigment Red No. 81:1, and C.I. Pigment Violet Nos. 1, 2, 3, 27, and 39), dioxazine pigments (such as C.I. Pigment Violet Nos. 23 and 37), diketopyrrolopyrrole pigments (such as C.I. Pigment Red No. 254), perylene pigments (such as C.I. Pigment Violet No. 29), anthraquinone pigments (such as C.I. Pigment Violet Nos. 5:1, 31, and 33) and thioindigo series (such as C.I. Pigment Red Nos. 38 and 88).

Yellow pigments to be preferably used are azo pigments (preferred examples of which include monoazo pigment series C.I. Pigment Yellow Nos. 1, 3, 74, and 98, disazo pigment series C.I. Pigment Yellow Nos. 12, 13, 14, 16, 17, and 83, condensed azo series C.I. Pigment Yellow Nos. 93, 94, 95, 128, and 155, and benzimidazolone series C.I. Pigment Yellow Nos. 120, 151, 154, 156, and 180, and especially preferred ones of which are the ones not using a benzidine compound as a raw material), isoindoline-isoindolinone pigments (preferred examples of which include C.I. Pigment Yellow Nos. 109, 110, 137, and 139), quinophthalone pigments (preferred examples of which include C.I. Pigment Yellow No. 138), and flavanthrone pigments (e.g., C.I. Pigment Yellow No. 24).

Preferred examples of black pigments may include inorganic pigments (preferred examples of which include carbon black and magnetite), and aniline black.

Other than these, orange pigments (such as C.I. Pigment Orange Nos. 13 and 16) and green pigments (such as C.I. Pigment Green No. 7) may also be used.

The pigments usable for the ink of the invention may be either the foregoing bare pigments or surface-treated pigments. The conceivable methods of surface treatment include: a method of coating resin or wax on the surface, a method of attaching a surfactant, a method of bonding a reactive substance (for example, a silane coupling agent, an epoxy compound, polyisocyanate, and radicals resulting from diazonium salt) onto the surface of the pigment, and other methods. The methods are described in the following documents and patent documents:

(1) "Nature and Application of Metallic Soap", (Saiwai Shobo);

"Printing Ink Printing", (CMC publishing Co., Ltd., 1984);

(3) "Latest Pigment Application Technology", CMC Publishing Co. Ltd., 1986);

(4) U.S. Pat. Nos. 5,554,739 and 5,571,311; and (5) JP-A Nos. 9-151342, 10-140065, 10-292143, and 11-166145.

Especially, the self-dispersible pigments prepared by allowing a diazonium salt to act on carbon black described in United States patent document of the foregoing item (4) and the encapsulated pigments prepared by the method described in Japanese patent document of the foregoing item (5) are particularly effective because dispersing stability can be obtained without using excess dispersants in an ink.

In the ink of the invention, the pigment may also be further dispersed by using a dispersant. Usable dispersants are various known ones in accordance with respective pigments to be used, such as surfactant type low molecular weight dispersants and high molecular weight dispersants. Examples of the dispersants may include the ones described in JP-A No. 3-69949 and EP-A No. 549, 486. Further, a pigment derivative referred to as a synergist may also be added in order to accelerate the adsorption of the dispersant on the pigment when the dispersant is used.

The particle diameter of the pigment usable for the ink of the invention is preferably in the range of 0.01 to 10 $\mu$m, and more preferably in the range of 0.05 to 1 $\mu$m after dispersion.

For dispersing the pigment, known dispersion techniques used in the production of an ink or in the production of a toner may be used. Examples of the dispersing machine may include vertical and horizontal agitator mills, attritor, colloid mill, ball mill, three roll mill, pearl mill, super-mill, impeller, disperser, KD mill, dynatron, and pressure kneader. These are described in detail in "Latest Pigment Application Technology", (CMC Publishing Co., Ltd., 1986).

Then, a description will be given to the surfactant containable in the ink for ink jet recording of the invention.

By allowing the ink for ink jet recording of the invention to contain a surfactant, and adjusting the liquid physical properties of the ink, the ejection stability of the ink is improved. This allows excellent effects to be produced in the improvement of the water resistance of the resulting image, in the prevention of spreading of the printed ink, and in other respects.

Examples of the surfactant may include: anionic surfactants such as sodium dodecyl sulfate, sodium dodecyloxy sulfonate, and sodium alkylbenzene sulfonate; cationic surfactants such as cetyl pyridinium chloride, trimethyl cetyl ammonium chloride, and tetrabutyl ammonium chloride; nonionic surfactants such as polyoxyethylene nonylphenyl ether, polyoxyethylene naphthyl ether, and polyoxyethylene octylphenyl ether. Among these, the nonionic surfactants are preferably used.

The surfactant content of the ink is from 0.001 to 20 wt %, preferably from 0.005 to 10 wt %, and more preferably 0.01 to 5 wt %.

The ink for ink jet recording of the invention can be produced by dissolving or dispersing the azo dyes and preferably a surfactant in an aqueous medium. The term "aqueous medium" in the invention denotes the one obtained by adding, if required, additives such as a wetting agent, a stabilizer, and an antiseptic agent in water, or a mixture of water and a small amount of a water-miscible organic solvent.

When the ink solution of the invention is prepared, for a water soluble ink, preferably, it is first dissolved in water. Subsequently, various solvents and additives are added thereto, and dissolved and mixed therein, resulting in a uniform ink solution.

The usable dissolution methods at this step are various methods of dissolution by agitation, dissolution by ultrasonic irradiation, dissolution by shaking, and the like. Among these, the agitation method is in particular preferably used. For performing agitation, various methods of flow agitation, agitation utilizing a shear force using a reverse agitator or a dissolver, known in the field concerned, and the like are available. Whereas, the agitation method utilizing the shear force with the container bottom as with a magnetic stirrer may also be preferably used.

Examples of the water-miscible organic solvent to be usable in the invention may include alcohols (e.g., methanol, ethanol, propanol, isopropanol, butanol, isobutanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Incidentally, these water-miscible organic solvents may also be used in combination of two or more thereof.

When the phthalocyanine dye is an oil soluble dye, the ink solution can be prepared by dissolving the oil soluble dye in a high boiling point organic solvent, and then emulsifying and dispersing it in an aqueous medium.

The boiling point of the high boiling point organic solvent for use in the invention is not less than 150° C., and preferably not less than 170° C.

Examples thereof may include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl)phthalate), phosphoric acid or phosphonic acid esters (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic acid esters (e.g., 2-ethylhexylbenzoate, 2,4-dichlorobenzoate, dodecylbenzoate, and 2-ethylhexyl-p-hydroxybenzoate), amides (e.g., N,N-diethyldodecanamide, and N,N-diethyllaurylamide), alcohols or phenols (e.g., isostearyl alcohol and 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, and trioctyl citrate), aniline derivatives (e.g., N,N-dibutyl-2-butoxy-5-tert-octylaniline), chlorinated paraffins (e.g., paraffins having a chlorine content of 10% to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, and 4-(4-dodecyloxyphenylsulfonyl)phenol), carboxylic acids (e.g., 2-(2,4-di-tert-amylphenoxy)butyric acid and 2-ethoxyoctanedecanoic acid), and alkylphosphoric acids (e.g., di-(2-ethylhexyl)phosphoric acid, and diphenylphosphoric acid). The high boiling point organic solvents can be used in an amount of 0.01 to 3 times, and preferably 0.01 to 1.0 times based on the amount of the oil soluble dye on a weight basis.

These high boiling point organic solvents may be used alone, or in mixture of several kinds thereof [e.g., tricresyl phosphate and dibutyl phthalate, trioctyl phosphate and di(2-ethylhexyl)sebacate, and dibutyl phthalate and poly(N-t-butylacrylamide)].

The examples of the compound other than the foregoing ones of the high boiling point organic solvents for use in the invention and/or the synthesis method of these high boiling point organic solvents are described in, for example, the following documents: U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, EP-A Nos. 276,319, 286,253, 289,820, 309,158, 309,159, 309,160, 509,311, and 510,576, DD Nos. 147, 009, 157, 147, 159, 573, and 225, 240A, GB-A No. 2.091,124, and JP-A Nos. 48-47335, 50-26530, 51-25133, 51-26036, 51-27921, 51-27922, 51-149028, 52-46816, 53-1520, 53-1521, 53,15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946, and 4-346338.

The high boiling point organic solvents are used in an amount of 0.01 to 3.0 times, and preferably 0.01 to 1.0 times based on the amount of the oil soluble dye on a weight basis.

In the invention, the oil soluble dye or the high boiling point organic solvent is emulsified and dispersed in an aqueous medium, to be used. For emulsification and dispersion, a low boiling point organic solvent can be used occasionally from the viewpoint of the emulsifiability. The low boiling point organic solvent is an organic solvent having a boiling point of not less than about 30° C. and not more than 150° C. under normal pressure. Non-limiting examples of the low boiling point organic solvent to be preferably used include: esters (e.g., ethyl acetate, butyl acetate, ethyl propionate, β-ethoxyethyl acetate, and methylcellosolve acetate), alcohols (e.g., isopropyl alcohol, n-butyl alcohol, and secondary butyl alcohol), ketones (e.g., methyl isobutyl ketone, methyl ethyl ketone, and cyclohexanone), amides (e.g., dimethylformamide, and N-methylpyrrolidone), and ethers (e.g., tetrahydrofuran and dioxane).

Emulsification and dispersion are performed by dispersing an oil phase, wherein a dye is dissolved in the high boiling point organic solvent, or occasionally a mixed solvent of the high boiling point organic solvent and the low boiling point organic solvent, into a water-based aqueous phase to form oily droplets. At this step, if necessary, it is possible to add additives such as a surfactant, a wetting agent, a dye stabilizer, an emulsion stabilizer, an antiseptic agent, and an antifungal agent, described later, into either or both of the aqueous phase and the oil phase.

A general emulsification method is a method in which the oil phase is added to the aqueous phase. However, a so-called phase inversion emulsification method, in which the aqueous phase is added dropwise to the oil phase, can also be preferably used. Incidentally, also when the phthalocyanine dye for use in the invention is water soluble, and the additives are oil soluble, the foregoing emulsification method is applicable thereto.

For emulsification and dispersion, various surfactants can be used. Preferred examples thereof include: anionic surfactants such as fatty acid salts, alkyl sulfuric acid ester salts, alkyl benzenesulfonic acid salts, alkyl naphthalenesulfonic acid salts, dialkyl sulfosuccinic acid salts, alkyl phosphoric acid ester salts, naphthalenesulfonic acid formalin condensate, and polyoxyethylenealkylsulfuric acid ester salts; nonionic surfactants such as polyoxyethylene alkyl ether, polyoxyethylenealkylallyl ether, polyoxyethylene fatty acid esters, sorbitan fatty acid esters, polyoxyethylenesorbitan fatty acid esters, polyoxyethylenealkylamine, glycerin fatty acid esters, and oxyethyleneoxypropylene block copolymers. Further, SURFYNOLS (Air Products & Chemicals Co.), which is an acetylene type polyoxyethyleneoxide surfactant, is also preferably used. Still further, aminoxide type amphoteric surfactants such as N,N-dimethyl-N-alkylamineoxide, and the like are also preferred. The ones described as surfactants in JP-A No. 59-157636 pp. (37)–(38), and Research Disclosure No. 308119 (1989) may also be used.

Whereas, it is also possible to add a water soluble polymer in combination with the surfactants for the purpose of attaining stabilization immediately after emulsification. Examples of the water soluble polymer to be preferably used include polyvinyl alcohol, polyvinylpyrrolidone, polyethylene oxide, polyacrylic acid, and polyacrylamide, and copolymers thereof. Natural water soluble polymers such as polysaccharides, casein and gelatin are also preferably used. Further, for stabilizing the dye dispersion, polyvinyls obtained by polymerization of acrylic acid esteres, methacrylic acid esters, vinyl esters, acrylamides, methacrylamides, olefins, styrenes, vinyl ethers, and acrylonitriles, which are substantially insoluble in aqueous media, polyurethanes, polyesters, polyamides, polyureas, polycarbonates, or the like can also be used in combination. These polymers preferably contain —$SO_3^-$ or —$COO^-$. When the polymers substantially insoluble in aqueous media are used in combination, the polymers are used in an amount of preferably not more than 20 wt %, and more preferably not more than 10 wt % based on the amount of the high boiling point organic solvent.

When the oil soluble dye and the high boiling point organic solvent are dispersed by emulsification and dispersion to prepare a water-based ink, it is particularly important to control the size of particles thereof. In order to enhance the color purity and density when an image is formed by ink jet, it is essential to make the average particle size small. The size is preferably not more than 1 μm, and more preferably from 5 to 100 nm in volume average particle diameter.

The volume average particle diameter and the particle size distribution of the dispersed particles can be measured with ease by known methods, for example, by using a static light scattering method, a dynamic light scattering method, and a centrifugal precipitation method, and in addition, the method described on pages 417 to 418 of Experimental Chemistry Lecture, fourth edition. For example, by diluting the ink solution with distilled water so that the particle concentration in the ink becomes 0.1 to 1 wt %, it is possible to perform the measurements with ease by means of a commercially available volume average particle diameter measuring machine (e.g., MICROTRACK UPA (made by NIKKISO Co., Ltd.)). Further, the dynamic light scattering method utilizing the laser Doppler effect is capable of particle diameter measurement down to a small size, and hence it is particularly preferred.

The term "volume average particle diameter" means the average particle diameter weighted with the particle volume, and the value obtained by dividing the total of the products of respective particle diameters and volumes of the particles by the total volume of the particles, in the aggregation of particles. The volume average particle diameter is described on page 119 of "Chemistry of Polymer Latexes" (written by Soichi Muroi, published by Kobunshi Kankokai).

Whereas, it has been revealed that the presence of coarse particles also plays a very major role in printing performance. Namely, it has been proved that a nozzle of a head is clogged with coarse particles, or coarse particles form stains even if the nozzle is not clogged, which causes a failure to eject ink or a twist of ejected ink, seriously affecting the printing performance. In order to prevent this, it is important to control the number of particles having a size of not less than 5 μm at not more than 10, and the number of particles having a size of not less than 1 μm at not more than 1000 per μl of ink in the resulting ink form.

As methods for removing these coarse particles, there can be used known centrifugal separation methods, microfiltration methods, and other known methods. These separating means may be applied immediately after emulsification and dispersion, or after addition of various additives such as a wetting agent and a surfactant to the emulsion dispersion, and immediately before charging the dispersion into ink cartridges.

As an effective means for reducing the average particle size, and removing coarse particles, there can be used a mechanical emulsifier.

As the emulsifiers, there can be used known apparatuses of a simple stirrer or impeller stirring system, an in-line stirring system, a mill system such as a colloid mill, and an ultrasonic system. The use of a high-pressure homogenizer is particularly preferred.

As to the high-pressure homogenizer, its detailed mechanism is described in U.S. Pat. No. 4,533,254, JP-A No. 6-47264, and the like. Examples of the commercially available apparatus include Gaulin Homogenizer (A. P. V. Gaulin Inc.), Microfluidizer (Microfluidex Inc.), and Artimizer (Sugino Machine Co., Ltd.).

Further, a high-pressure homogenizer provided with a mechanism for finely graining particles in an extra-high pressure jet stream as recently described in U.S. Pat. No. 5,720,551 is particularly effective for emulsification and dispersion of the invention. Examples of the emulsifiers using the extra-high pressure jet streams may include De Bee 2000 (Bee International Ltd.).

When the particles are emulsified with the high-pressure emulsification and dispersion apparatus, the pressure is not less than 50 MPa, preferably not less than 60 MPa, and more preferably not less than 180 MPa.

For example, the use of two or more kinds of emulsifiers in combination in a process of passing the emulsion through a high-pressure homogenizer after emulsification with a stirring emulsifier, or other processes, is a particularly preferred method. Further, a method is also preferred in which after the particles are once emulsified and dispersed with the emulsifier, additives such as a wetting agent and a surfactant are added, and then, the emulsified dispersion is allowed to pass through the high-pressure homogenizer again during charging of ink into cartridges.

When a low boiling point organic solvent is contained together with a high boiling point organic solvent, the low boiling point organic solvent is preferably removed from the viewpoints of the stability of the emulsions, and the safety and sanitation. As methods for removing the low boiling point organic solvent, various known methods can be used according to the kind of the solvent. Namely, evaporation methods, vacuum evaporation methods, ultrafiltration methods, and the like can be used. It is preferred that the low boiling point organic solvent removing step is performed as soon as possible immediately after emulsification.

Incidentally, for the methods of preparing the ink for ink jet, the details thereof are described in respective publications of JP-A Nos. 5-148436, 5-295312, 7-97541, 7-82515, and 7-118584. The methods can also be used for the preparation of the ink for ink jet recording of the invention.

It is possible to appropriately select additives, and use them in proper amounts for the ink for ink jet recording obtained in the invention. Such additives include an anti-drying agent for preventing an ink jet outlet from being clogged with an ink due to drying, a penetration accelerator for allowing an ink to penetrate paper better, an UV absorber, an antioxidant, a viscosity modifier, a surface tension regulator, a dispersant, a dispersion stabilizer, an antifungal agent, a corrosion inhibitor, a pH adjuster, an antifoaming agent, a chelating agent, and the like.

As the anti-drying agents for use in the invention, water soluble organic solvents having a lower vapor pressure than that of water are preferred. Specific examples thereof may include polyhydric alcohols typified by ethylene glycol, propylene glycol, diethylene glycol, polyethylene glycol, thiodiglycol, dithiodiglycol, 2-methyl-1,3-propanediol, 1,2, 6-hexanetriol, an acetylene glycol derivative, glycerin, and trimethylolpropane; lower alkyl ethers of polyhydric alcohols such as ethylene glycol monomethyl (or ethyl) ether, diethylene glycol monomethyl (or ethyl) ether, and triethylene glycol monomethyl (or butyl) ether, heterocycles such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; multifunctional compounds such as diacetone alcohol and diethanolamine; and urea derivatives. Out of these, polyhydric alcohols such as glycerin and diethylene glycol are more preferred. Further, the foregoing anti-drying agents may be used alone, or in combination of two or more thereof. The anti-drying agents are preferably contained in an ink in an amount of 10 to 50 wt %.

The penetration accelerators for use in the invention include alcohols such as ethanol, isopropanol, butanol, di(t-ri)ethylene glycol monobutyl ether, and 1,2-hexanediol, sodium laurylsulfate, sodium oleate, and nonionic surfactants. These produce the sufficient effect when contained in an ink in an amount of 10 to 30 wt %, and are preferably added in an amount within such a range that no blur of printing and no print through occur.

As the UV absorbers to be used for improving the storage stability of an image in the invention, there are usable benzotriazole compounds described in JP-A Nos. 58-185677, 61-190537, 2-782, 5-197075, and 9-34057, and the like, benzophenone compounds described in JP-A Nos. 46-2784 and 5-194483, U.S. Pat. No. 3,214,463, and the like, cinnamic acid compounds described in JP-B Nos. 48-30492 and 56-21141, JP-A No. 10-88106, and the like, triazine compounds described in JP-A Nos. 4-298503, 8-53427, 8-239368, and 10-182621, JP-W No. 8-501291, and the like, and the compounds described in Research Disclosure, No. 24239, and the compounds typified by stilbene and benzoxazole compounds, which absorb ultraviolet rays to emit fluorescence, so-called fluorescent brightening agents.

In the invention, as antioxidants used for improving the storage stability of an image, various organic and metal complex antifading agents can be used. The organic antifading agents include hydroquinones, alkoxyphenols, dialkoxyphenols, phenols, anilines, amines, indans, chromans, alkoxyanilines, heterocycles, and the like. Metal complexes include nickel complexes, zinc complexes, and the like. More specifically, the compounds described in the patents cited in Research Disclosure, No. 17643, Items I to J of the VII th, ibid., No. 15162, ibid., No. 18716, page 650, left-side column, ibid., No. 36544, page 527, ibid., No. 307105, page 872, and ibid., No. 15162, and the compounds contained in the general formulae and compound examples of typical compounds described in JP-A No. 62-215272, pages 127 to 137 can be used.

The antifungal agents for use in the invention may include sodium dehydroacetate, sodium benzoate, sodium pyridine-thione-1-oxide, ethyl p-hydroxybenzoate, and 1,2-benzisothiazolin-3-one, and salts thereof. These are preferably used in an ink each in an amount of 0.02 to 5.00 wt %.

Incidentally, the details thereof are described in "Antibacterial and Antifungal Dictionary" (edited by the dictionary editing committee of The Society for Antibacterial and Antifungal Agents, Japan), and the like.

Whereas, examples of the corrosion inhibitor may include an acid sulfite, sodium thiosulfate, ammonium thioglycolate, diisopropylammonium nitrite, pentaerythritol tetranitrate, dicyclohexylammonium nitrite, and benzotriazole. These are preferably used in an ink each in an amount of 0.02 to 5.00 wt %.

The pH adjuster for use in the invention can be preferably used in terms of pH adjustment, and impartment of dispersion stability, and other respects. It is preferred that the pH of an ink at 25° C. is adjusted in the range of 8 to 11. When the pH is less than 8, the solubility of the dye is reduced, so that the nozzle tends to be clogged. When the pH exceeds 11, the water resistance tends to be deteriorated. As the pH adjusters, mention may be made of organic bases, inorganic alkalis, and the like, as basic ones, and organic acids, inorganic acids, and the like, as acidic ones.

Examples of the basic compounds usable may include inorganic compounds such as sodium hydroxide, potassium hydroxide, sodium carbonate, potassium carbonate, sodium hydrogencarbonate, potassium hydrogencarnonate, sodium acetate, potassium acetate, sodium phosphate, and sodium hydrogenphosphate, organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, and collidine.

Examples of the acidic compounds usable may include inorganic compounds such as hydrochloric acid, sulfuric acid, phosphoric acid, boric acid, sodium hydrogensulfate, potassium hydrogensulfate, potassium dihydrogenphosphate, and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid, and quinolinic acid.

The conductivity of the ink of the invention falls within a range of 0.01 to 10 S/m. Especially, the conductivity is preferably in the range of 0.05 to 5 S/m.

The conductivity can be determined by an electrode method using commercially available saturated potassium chloride.

The conductivity can be controlled mainly by the ion concentration in a water-based solution. When the salt concentration is high, it is possible to perform desalting using an ultrafiltration membrane, or the like. Further, when the conductivity is controlled by addition of a salt or the like, it is possible to control the conductivity by addition of various organic salts or inorganic salts.

Examples of inorganic salts usable may include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium hydrogenphosphate, boric acid, potassium dihydrogenphosphate, and sodium dihydrogenphosphate, organic compounds such as sodium acetate, potassium acetate, potassium tartrate, sodium tartrate, sodium benzoate, potassium benzoate, sodium p-toluenesulfonate, potassium saccharate, potassium phthalate, and sodium picolinate.

Further, it is also possible to control the conductivity by selecting other additive components.

The ink viscosity of the invention is 1 to 20 mPa·s at 25° C. It is further preferably 2 to 15 mPa·s, and in particular preferably 2 to 10 mPa·s. If it exceeds 30 mPa·s, the fixing speed of the recorded image decreases, and the ejection performance is also reduced. If it is less than 1 mPa·s, the recorded image becomes blurred, resulting in quality degradation.

It is possible to control the viscosity by the amount of the ink solvent added. Examples of the ink solvent include glycerin, diethylene glycol, triethanolamine, 2-pyrrolidone, diethylene glycol monobutyl ether, and triethylene glycol monobutyl ether.

Further, a viscosity modifier may also be used. Examples of the viscosity modifier may include celluloses, water soluble polymers such as polyvinyl alcohol, and nonionic surfactants. More specifically, these are described in "Viscosity Control Technology" (GIJUTU JOHO KYOKAI, 1999), chapter 9, and "Chemicals for Ink Jet Printers (extended edition 98)—Development and Trend/Prospect Examination of Materials" (CMC, 1997) p.p., 162 to 174.

The method for measuring the viscosity of a liquid is described in details in JIS Z8803. However, it is possible to perform the measurement by means of a commercially available viscometer with ease. Examples of the rotary type viscometer include B model viscometer and E model viscometer from TOKYO KEIKI. In the invention, the measurement was carried out at 25° C. by means of oscillational VM-100A-L model from YAMAICHI ELECTRONICS Co., Ltd. The unit of the viscosity is pascal second (Pa·s), and generally, millipascal second (mPa·s) is used.

As for the surface tension of the ink for use in the invention, both the dynamic and static surface tensions are each preferably 20 to not more than 50 mN/m, and more preferably 20 to not more than 40 mN/m, at 25° C. If the surface tension exceeds 50 mN/m, printing quality is remarkably degraded in such a manner that, for example, the ejection stability is reduced, blurring for color mixing and feathering occur. Whereas, if the surface tension of the ink is set at not more than 20 mN/m, poor printing may occur due to the deposition of the ink on the hard surface for ejection.

For the purpose of controlling the surface tension, it is possible to add the foregoing various cationic, anionic, and nonionic surfactants. The surfactants are used in an amount preferably in the range of 0.01 to 20 wt %, and more preferably in the range of 0.1 to 10 wt % based on the amount of the ink for ink jet. Further, the surfactants may be used in combination of two or more thereof.

As the static surface tension measurement methods, there are known the capillary rise method, the drop method, the ring method, and the like. In the invention, as the static surface tension measurement method, the vertical plate method is used.

A thin glass or platinum plate is partially immersed in a liquid, and vertically suspended, so that the surface tension of the liquid acts downward along the contact portion between the liquid surface and the plate. This force is balanced by an upward force. Thus, it is possible to measure the surface tension.

Whereas, as the dynamic surface tension measurement method, the vibration jet method, the meniscus drop method, the maximum bubble pressure method, and the like are known as described in, for example, "New Experimental Chemistry Lecture, vol.18, INTERFACE AND COLLOID" [Maruzen Co., Ltd., p. 69 to 90 (1977)]. Further, the liquid film rupture method as described in JP-A No. 3-2064 is known. In the invention, the differential bubble pressure method is used as the dynamic surface tension measurement method. Below, the measurement principle and method will be described.

Upon formation of bubbles in a solution made uniform by stirring, another gas-liquid interface is formed, so that the surfactant molecules in the solution gather to the surface of water at a given rate. When the bubble rate (formation speed of bubbles) is changed, and the formation speed is slowed, a larger number of surfactant molecules gather to the surfaces of the bubbles. Therefore, the maximum bubble pressure immediately before bursting of the bubbles is reduced. As a result, it is possible to detect the maximum bubble pressure (surface tension) with respect to the bubble rate. As a preferred dynamic surface tension measurement, mention may be made of a method as follows: Bubbles are formed using two large and small probes, and the pressure difference between the two probes under the maximum bubble pressure state is determined to calculate the dynamic surface tension.

The nonvolatile component in the ink of the invention is preferably in an amount of 10 to 70 wt % based on the total amount of the ink in terms of the ejection stability of the ink, the printed image quality, various fastnesses of the image, and the reductions in the blurring of image after printing and stickiness of the printed surface. It is more preferably in an amount of 20 to 60 wt % in terms of the ejection stability of the ink and the reduction in blurring of the image after printing.

The term "nonvolatile components" herein used denote liquid and solid components, and high molecular weight components having a boiling point of not less than 150° C. at 1 atmospheric pressure. The nonvolatile components of the ink for ink jet recording are dyes, high boiling point solvents, polymer latexes, if necessary, added, surfactants, dye stabilizers, antifungal agents, buffers, and the like. Most of these nonvolatile components other than the dye stabilizers have the properties of: reducing the dispersion stability of the ink; further inhibiting the stabilization by the association of the dye on image-receiving paper because of their presence on the ink jet image-receiving paper even after printing; and degrading various fastnesses of the image portion, and worsening the blurring of the image under high humidity conditions.

In the invention, it is also possible that the ink contains high molecular weight compounds. The term "high molecular weight compounds" herein used denote all the high molecular weight compounds having a number-average molecular weight of not less than 5000 contained in the ink. Examples of the high molecular weight compounds may include water soluble high molecular weight compounds which substantially dissolve in aqueous media, water-dispersible high molecular weight compounds such as polymer latex and polymer emulsion, and further alcohol soluble high molecular weight compounds which dissolve in polyhydric alcohols for use as co-solvents. However, any high molecular weight compounds are acceptable as the high molecular weight compounds in the invention so long as they are substantially dissolved or dispersed uniformly in the ink solution.

Specific examples of the water soluble high molecular weight compounds may include: water soluble polymers such as polyvinyl alcohol, silanol modified polyvinyl alcohol, carboxymethyl cellulose, hydroxyethyl cellulose, polyvinylpyrrolidone, polyalkylene oxides such as polyethylene oxide and polypropylene oxide, and polyalkylene oxide derivatives, natural water soluble polymers such as polysaccharides, starch, cationic starch, casein, and gelatin, aqueous acrylic resins such as polyacrylic acid and polyacrylamide, and copolymers thereof, aqueous alkyd resins, and water soluble high molecular weight compounds each of which has a —$SO_3^-$ or —$COO^-$ group in the molecule, and substantially dissolves in an aqueous medium.]

Whereas, examples of polymer latex may include styrene-butadiene latex, styrene-acryl latex, and polyurethane latex. Further, examples of polymer emulsion may include acrylic emulsions.

These water soluble high molecular weight compounds may be used alone, or in combination of two or more thereof.

The water soluble high molecular weight compound is used for controlling the viscosity of the ink within such a viscosity range as to provide favorable ejection characteristics as a viscosity modifier as already described. If it is added in a large amount, the viscosity of the ink is increased, resulting in a reduction in the ejection stability of the ink solution. Accordingly, the nozzle becomes more likely to be clogged with precipitates due to changes with time in the ink.

Although the amount of the high molecular weight compound as the viscosity modifier to be added depends upon the molecular weight of the compound to be added (a higher molecular weight compound is required to be added in a smaller amount), the high molecular weight compound is added in an amount of 0 to 5 wt %, preferably 0 to 3 wt %, and more preferably 0 to 1 wt % based on the total amount of the ink.

In the invention, aside from the foregoing surfactants, as the surface tension adjuster, mention may be made of nonionic, cationic, and anionic surfactants. Examples thereof may include: anionic surfactants such as fatty acid salts, alkyl sulfuric acid ester salts, alkyl benzenesulfonic acid salts, alkyl naphthalenesulfonic acid salts, dialkyl sulfosuccinic acid salts, alkyl phosphoric acid ester salts, naphthalenesulfonic acid formalin condensate, and polyoxyethylenealkylsulfuric acid ester salts; nonionic surfactants such as polyoxyethylene alkyl ether, polyoxyethylenealkyl allyl ether, polyoxyethylene fatty acid esters, sorbitan fatty acid esters, polyoxyethylenesorbitan fatty acid esters, polyoxyethylenealkylamine, glycerin fatty acid esters, and oxyethyleneoxypropylene block copolymers. SURFYNOLS (Air Products & Chemicals Co.), which is an acetylene type polyoxyethyleneoxide surfactant, is also preferably used. Still further, amineoxide type amphoteric surfactants such as N,N-dimethyl-N-alkylamineoxide, and the like are also preferred. The ones described as surfactants in JP-A No. 59-157636 pp. (37)–(38), and Research Disclosure No. 308119 (1989) may also be used.

Further, in the invention, the foregoing cationic, anionic, and nonionic various surfactants as the dispersant, or dispersion stabilizer, fluorine-containing, and silicone-containing compounds as antifoaming agents, chelating agents typified by EDTA, and the like may also be used, if required.

A description will be given to the recording paper and the recording film which are reflection media for use in the invention.

Each usable support in the recording paper and the recording film is the one manufactured in the following manner, or the like. To the material composed of chemical pulp such as LBKP or NBKP, mechanical pulp such as GP, PGW, RMP, TMP, CTMP, CMP or CGP, waste paper pulp such as DIP, or the like, if required, additives such as a conventionally known pigment, a binder, a sizing agent, a fixing agent, a cationic agent, and a paper strength reinforcing agent are mixed, and the mixture is subjected to various devices such as a Fourdrinier paper machine and a cylinder papermachine. Other than these supports, the support may be any of synthetic paper and a plastic film sheet. Desirably, the thickness of the support is 10 to 250 μm, and the weighing capacity thereof is 10 to 250 g/m².

An image receiving layer and a back coating layer may also be provided on the support as it is, resulting in an image receiving material. Alternatively, after size press coating, or after formation of an anchor coating layer, with starch, polyvinyl alcohol or the like, the image receiving layer and the back coating layer may also be provided on the support, resulting in an image receiving material. Further, the support may be subjected to flattening processing by a calender device such as a machine calender, a TG calender or a soft calender.

As the supports in the invention, a sheet of paper having surfaces each laminated with a film of polyolefin (e.g., polyethylene, polystyrene, or polybutene, or copolymers thereof), or polyethylene terephthalate, and a plastic film are more preferably used. Preferably, a white pigment (e.g., titanium oxide or zinc oxide) or a tinting dye (e.g., cobalt blue, ultramarine, or neodymium oxide) is added into the polyolefin.

The image receiving layer to be provided on the support contains a porous material and an aqueous binder. Further, the image receiving layer preferably contains pigments. Preferred pigments are white pigments. Examples of the white pigment may include inorganic white pigments such as calcium carbonate, kaolin, talc, clay, diatomaceous earth, synthetic amorphous silica, aluminium silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene-based pigments, acrylic pigments, urea resins, and melamine resins. Particularly preferably, a porous inorganic white pigment is favorable, and synthetic amorphous silica having a large pore area, and the like are suitable. As the synthetic amorphous silica, both silicic anhydride obtained by a dry production process (gas phase method) and silicic hydrate obtained by a wet production process can be used.

Specific examples of the usable recording paper including the image receiving layer containing the foregoing pigments include those described in JP-A Nos. 10-81064, 10-119423, 10-157277, 10-217601, 11-348409, 13-138621, 12-43401, 12-211235, 12-309157, 13-96897, 13-13-8627, 11-91242, 8-2087, 8-2090, 8-2091, 8-2093, 8-174992, 11-192777, 13-301314, and the like.

Examples of the aqueous binder to be contained in the image receiving layer may include water soluble high polymers such as polyvinyl alcohol, silanol-modified polyvinyl alcohol, starch, cationic starch, casein, gelatin, carboxymethylcellulose, hydroxyethylcellulose, polyvinylpyrrolidone, polyalkylene oxide, and polyalkylene oxide derivatives, and water-dispersible high polymers such as styrenebutadiene latex and acrylic emulsion. These aqueous binders may be used alone, or in combination of two or more thereof. In the invention, out of these, particularly, polyvinyl alcohol, and silanol-modified polyvinyl alcohol are preferred in terms of the adhesion to the pigment and the peel resistance of the ink receiving layer.

The image receiving layer may contain, other than the pigment and the aqueous binder, a mordant, a waterproof agent, a light resistance improver, a gas resistance improver, a surfactant, a hardening agent, and other additives.

It is preferable that the mordant to be added into the image receiving layer is immobilized. To this end, a polymer mordant is preferably used.

The polymer mordant is described in each publication of: JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The image receiving materials containing the polymer mordants described on pages 212 to 215 in JP-A No. 1-161236 are particularly preferred. When the polymer mordants described in the same publication are used, it is possible to obtain an image of excellent image quality, and to improve the light resistance of the image.

The waterproof agent is effective for making the image resistant to water. A cationic resin is particularly desirable as the waterproof agent. Examples of the cationic resin may include polyamidepolyamine epichlorohydrin, polyethyleneimine, polyaminesulfone, dimethyldiallylammonium chloride polymer, and cationic polyacrylamide. The content of the cationic resin is preferably 1 to 15 wt %, and particularly preferably 3 to 10 wt % based on the total solid content of the ink receiving layer.

Examples of the light resistance improver and the gas resistance improver may include: phenol compounds, hindered phenol compounds, thio ether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water soluble reducing compounds, organic acids, inorganic acids, hydroxy group-containing organic acids, benzotriazole compounds, benzophenone compounds, triazine compounds, heterocyclic compounds, water soluble metal salts, organometallic compounds, and metal complexes.

Specific examples of the compounds may include the ones described in JP-A Nos. 10-182621, 13-260519, and 12-260519, JP-B Nos. 4-34513 and 4-34512, JP-A Nos. 11-170686, 60-67190, 7-276808, and 12-94829, JP-W No. 8-512258, and JP-A No. 11-321090.

The surfactant functions as a coating aid, a releasing aid, a slipping aid, or an antistatic agent. The surfactants are described in each publication of JP-A Nos. 62-173463 and 62-183457.

Organofluoro compounds may also be used in place of the surfactant. The organofluoro compounds are preferably hydrophobic. Examples of the organofluoro compounds may include a fluorine-based surfactants, oily fluorine-based compounds (e.g., fluorine oil), and solid fluorine compound resins (e.g., tetrafluoroethylene resin). The organofluoro compounds are described in each publication of JP-B No. 57-9053 (column 8 to 17), and JP-A Nos. 61-20994 and 62-135826.

As the hardening agents, there may be used the materials described on page 222 of JP-A NO. 1-161236, and JP-A Nos. 9-263036, 10-119423, and 13-310547.

As other additives to be added to the image receiving layer, mention may be made of: a pigment dispersant, a thickener, an anti-foaming agent, dyes, a fluorescent brightening agent, an antiseptic agent, a pH adjuster, a matting agent, a hardening agent, and the like. Incidentally, the ink receiving layer may be formed in either one layer or two layers.

It is also possible to provide a back coating layer on the recording paper or the recording film. As the components which can be added to the layer, mention may be made of a white pigment, an aqueous binder, and other components.

Examples of the white pigment to be contained in the back coating layer may include: inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide, organic pigments such as styrene-based plastic pigments, acrylic plastic pigments, polyethylene, micro capsules, urea resins, and melamine resins.

Examples of the aqueous binder to be contained in the back coating layer may include: water soluble high polymers such as styrene/maleate copolymer, styrene/acrylate copolymer, polyvinyl alcohol, silanol-modified polyvinyl alcohol, starch, cationic starch, casein, gelatin, carboxymethylcellulose, hydroxyethylcellulose, and polyvinylpyrrolidone, and water-dispersible high polymers such as styrenebutadiene latexes and acrylic emulsions. As other components to be contained in the back coating layer, mention may be made of an anti-foaming agent, a foam inhibitor, dyes, a fluorescent brightening agent, an antiseptic agent, a waterproof agent, and the like.

A fine polymer particle dispersion may also be added to the constituent layers (including the back layers) of the ink-jet recording paper and the recording film. The fine polymer particle dispersion is used for the purpose of improvements of the film properties such as dimensional stabilization, curl prevention, adhesion prevention, and film crack prevention. The fine polymer particle dispersion is described in each publication of JP-A Nos. 62-245258, 62-136648, and 62-110066. Addition of the fine polymer particle dispersion having a low glass transition temperature (of not more than 40° C.) to a mordant-containing layer can prevent the layer from cracking or curing. Further, addition of the fine polymer particle dispersion having a high glass transition temperature to the back layer can also prevent curling thereof.

The ink for ink jet recording of the invention can also be used for other applications than ink jet recording. For example, it is usable for materials for display images, image forming materials of interior decorative materials, and image forming materials of exterior decorative materials.

The materials for display images denote various articles such as poster, wallcovering, small decorative articles (such as ornaments and dolls), leaflet for commercial advertisement, packaging paper, wrapping materials, paper bag, plastic bag, package materials, signboard, images drawn or attached on the sides of means of transportation (such as automobiles, buses, and trains), and clothes with logos. When the dye of the invention serves as a material for forming display images, the images include all the patterns of the dye recognizable by human, such as abstract designs, characters, and geometrical patterns, other than the image in a narrow sense.

The interior decorative materials denote various articles such as wallcovering, small decorative articles (such as ornaments and dolls), members of luminaires, members of furniture, and designed members of a floor and a ceiling. When the dye of the invention serves as a material for forming images, the images include all the patterns of the dye recognizable by human, such as abstract designs, characters, and geometrical patterns, other than the image in a narrow sense.

The exterior decorative materials denote various articles such as wall materials, roofing materials, signboard, gardening materials, small exterior decorative articles (such as ornaments and dolls), and members of exterior luminaires. When the dye of the invention serves as an image forming material, the images include all the patterns of the dye recognizable by human, such as abstract designs, characters, and geometrical patterns, other than the image in a narrow sense.

In the foregoing applications, as the media on which patterns are formed, mention may be made of various articles such as paper, fiber, cloth (including nonwoven fabric), plastic, metals, and ceramics. Dyeing can be accomplished in such a manner that the dye is immobilized in a mordanted or printed form, or in the form of a reactive group-introduced reactive dye. Out of these, desirably, dyeing is preferably carried out in a mordanted form.

In manufacturing of the ink for ink jet recording of the invention, it is also possible to apply ultrasonic vibration in the dissolution step of additives such as a dye, or other steps.

The ultrasonic vibration is applied for the following purpose. An ultrasonic energy equal to or more than the energy received on a recording head is previously applied during the manufacturing step of the ink to remove bubbles in order to prevent bubbles from being formed due to the pressure applied onto the ink at the recording head.

The ultrasonic vibration is caused by ultrasonic waves having a frequency of, generally, not less than 20 kHz, preferably not less than 40 kHz, and more preferably 50 kHz. Whereas, the energy applied to the solution due to the ultrasonic vibration is, generally, not less than $2\times10^7$ J/m$^3$, preferably not less than $5\times10^7$ J/m$^3$, and more preferably not less than $1\times10^8$ J/m$^3$. Whereas, the length of time during which ultrasonic vibration is applied is generally about 10 minutes to 1 hour.

The step of applying an ultrasonic vibration can be carried out with effect at any time so long as it is carried out subsequent to charging of the dye to the medium. Even if the ink after completion is once stored, and then, applied with an ultrasonic vibration, an effect is produced. However, application of an ultrasonic vibration when the dye is dissolved and/or dispersed in a medium produces a greater effect of bubble removal, and further accelerates the dissolution and/or dispersion of the colorant to the medium by the ultrasonic vibration, and hence this process is preferred.

Namely, the step of applying an ultrasonic vibration may be performed in any case of either during the step of dissolving and/or dispersing the dye in the medium or after the step. In other words, the step of at least applying an ultrasonic vibration can be arbitrarily performed not less than once during the period after ink preparation and until the ink becomes a finished product.

As an embodiment, the step of dissolving and/or dispersing a dye in a medium preferably has a step of dissolving the dye in a partial medium of the whole medium, and a step of mixing the residual medium. An ultrasonic vibration is preferably applied in at least any step of the foregoing steps. It is more preferable that at least an ultrasonic vibration is applied in the step of dissolving the dye in a partial medium of the whole medium.

Mixing of the residual medium may be performed in a single step or in a plurality of steps.

Further, heat degassing or reduced-pressure degassing is preferably adopted in combination in ink manufacturing in accordance with the invention because the effect of reducing bubbles in the ink is enhanced. The heat degassing step or the reduced-pressure degassing step is preferably performed simultaneously with, or subsequent to the step of mixing the residual medium.

As ultrasonic vibration generating means in the step of applying an ultrasonic vibration, mention may be made of known apparatuses such as an ultrasonic dispersing apparatus.

The step of removing dust which is a solid component by filtration, to be further performed after preparation of the solution, is important for producing the ink for ink jet recording of the invention. A filter is used for this operation. The filter for use in this step has an effective diameter of not more than 1 μm, preferably not more than 0.3 μm and not less than 0.05 μm, and particularly preferably not more than 0.3 μm and not less than 0.25 μm. Various materials may be used as the materials for the filter. Especially for an ink of a water soluble dye, filters made for use in water-based solvents are preferably used. Out of these, a filter made of a polymer material which is less likely to cause dust is preferably used. Filtration can be accomplished by feeding the solution through the filter. Alternatively, any method of pressurized filtration and reduced-pressure filtration is also available.

After the filtration, air is often taken in the solution. Bubbles resulting from the air also often cause the instability of images in ink jet recording. For this reason, it is preferable that the foregoing defoaming step is separately established. Defoaming can be accomplished by allowing the solution after filtration to stand still. Alternatively, various methods such as ultrasonic defoaming and reduced-pressure defoaming utilizing commercially available apparatuses are available. For defoaming due to ultrasonic waves, the defoaming operation is performed preferably for 30 seconds to 2 hours, and more preferably for 5 minutes to about 1 hour.

These operations are preferably carried out utilizing the space in a clean room or on a clean bench in order to prevent the inclusion of dust during the operations. In the invention, particularly, the operations are preferably carried out in the space with a cleanness degree of not more than class 1000. Herein, the term "cleanness degree" denotes the value measured by a dust counter.

The volume of droplets of the ink ejected onto the recording material in the invention is preferably not less than 0.1 pl and not more than 100 pl. The ejected droplet volume is more preferably in the range of not less than 0.5 pl and not more than 50 pl, and particularly preferably in the range of not less than 2 pl and not more than 50 pl.

In the invention, the ink jet recording method has no restriction. The ink of the invention can be used in known methods such as: a charge control method in which the ink is ejected by utilizing electrostatic attraction; a drop on demand method (pressure pulse method) utilizing the vibration pressure of a piezoelectric element; an acoustic ink jet method in which electric signals are converted to acoustic beams, the beams are applied to the ink, and the emission pressure is utilized to eject the ink; and a thermal ink (bubble jet) method in which the ink is heated to form bubbles, and the generated pressure is utilized.

The ink jet recording methods include: a method in which a large number of drops of a low-density ink referred to as a photo ink are ejected in small volumes; a method in which the image quality is improved by using a plurality of inks having substantially the same hue and different densities; and a method utilizing a colorless, transparent ink. The control of the ejected droplet volume of the ink is mainly performed by a print head.

For example, for the thermal ink jet method, it is possible to control the ejected droplet volume according to the structure of the print heat. Namely, by changing the sizes of an ink chamber, a heating unit, and a nozzle, it is possible to eject ink in desired size of droplets. Also for the thermal ink jet method, by providing a plurality of print heads mutually different in sizes of the heating unit and the nozzle therein, it is possible to achieve ejection of droplets with a plurality of sizes.

As for the drop on demand method using a piezoelectric element, it is also possible to change the ejected droplet volume according to the structure of the print head as with the thermal ink jet method. However, by controlling the waveform of the driving signal for driving the piezoelectric element as described later, it is possible to eject droplets with a plurality of sizes by the same structured print heads.

In the invention, the ejection frequency for ejecting droplets of the ink on a recording material is preferably not less than 1 kHz.

In order to record a high-quality image as in a photograph, the ejected droplet density is required to be set at not less than 600 dpi (number of dots per inch) for reproducing a high-sharpness image with small ink droplets.

On the other hand, for ejecting droplets of ink with heads each having a plurality of nozzles, the number of heads which can be simultaneously driven is restricted to several tens to about 200 for the type in which recording paper and heads move in a direction orthogonal to each other for recording, or to several hundreds even for the type in which the heads are fixed, called a line head type. This is for the following reason. Since there is a limitation on the driving electric power, and the heat generation at heads affects images, it is not possible to drive a large number of head nozzles simultaneously. Accordingly, the recording speed tends to be slowed for performing recording with an increased ejected droplet density. However, by increasing the driving frequency, it is possible to increase the recording speed.

Control of the ejected droplet frequency can be accomplished by controlling the frequency of the head driving signals for heating the heads for the thermal ink jet method.

As for the piezoelectric method, it can be accomplished by controlling the frequency of signals for driving the piezoelectric element.

The driving of a piezoelectric head will be described. As for the signal of an image to be printed, the ejected droplet size, the ejected droplet velocity, and the ejected droplet frequency are determined by a printer control unit, so that a signal for driving a print head is formed. The driving signal is supplied to the print head. The ejected droplet size, the ejected droplet velocity, and the ejected droplet frequency are controlled by the signal for driving the piezoelectric head. In this step, the ejected droplet size and the ejected droplet velocity are determined by the form and the amplitude of the driving waveform. The frequency is determined by the cycle period of the signal.

If the ejected droplet frequency is set at 10 kHz, the head is driven every 100 microseconds, so that recording of one line is completed in 400 microseconds. By setting the moving speed of recording paper so that the length of movement per 400 microseconds is 1/600 inch, i.e., about 42 microns, it is possible to perform printing at a rate of one sheet per 1.2 seconds.

As for the constitution of a printing apparatus using the ink for ink jet recording of the invention, or the constitution of a printer thereof, the embodiment as disclosed in, for example, JP-A No. 11-170527 is preferred. Whereas, for an ink cartridge, the one disclosed in, for example, JP-A No. 5-229133 is preferred. As for the constitutions of attraction, the cap for covering a print head 28 at such a step, and the like, those disclosed in JP-A No. 7-276671 are preferred. Further, it is preferable that the filter for expelling bubbles as disclosed in JP-A No. 9-277552 is disposed in the vicinity of the head.

Whereas, it is preferable that the nozzle surface is subjected to the water repellent treatment as described in Japanese Patent Application No. 2001-016738. The application may be a printer to be connected to a computer, or an apparatus specialized in printing photographs.

As for the ink for ink jet recording of the invention, the average ejected droplet velocity for ejecting droplets on a recording material is set at preferably not less than 2 m/sec, and more preferably not less than 5 m/sec.

The ejected droplet velocity is controlled by controlling the form and the amplitude of the waveform for driving the head.

Further, by using a plurality of driving waveforms differently, it is possible to eject droplets with a plurality of sizes by the same head.

EXAMPLES

Below, the invention will be described by way of example, which should not be construed as limiting the scope of the invention.

EXAMPLE

Ultrapure water (resistance value: not less than 18 MΩ) was added to the following components to make the total amount 1 liter. Then, the resulting solution was stirred for 1 hour with heating at 30 to 40° C. Thereafter, the solution was filtrated under reduced pressure through a micron filter having an average pore size of 0.25 μm to prepare a yellow ink solution Y-101.

[Formulation of Yellow Ink Solution Y-101]

| (Solid components) | |
|---|---|
| Yellow dye (YI-58) | 35 g/l |
| Proxel | 5 g/l |
| Urea | 10 g/l |
| (Liquid components) | |
| Triethylene glycol monobutyl ether | 100 g/l |
| Glycerin | 115 g/l |

-continued

| | |
|---|---|
| Diethylene glycol | 70 g/l |
| 2-Pyrrolidone | 35 g/l |
| Triethanolamine (TEA) | 8 g/l |
| Surfynol STG | 10 g/l |

Further, a dark yellow ink solution DY-101 having the foregoing formulation further including a magenta dye (A) and a cyan dye (B) added therein was prepared.

[Formulation of Dark Yellow Ink Solution DY-101]

| | |
|---|---|
| (Solid components) | |
| Yellow dye (YI-58) | 35 g/l |
| Magenta dye (A) | 2 g/l |
| Cyan dye (B) | 2 g/l |
| Proxel | 5 g/l |
| Urea | 10 g/l |
| (Liquid components) | |
| Triethylene glycol monobutyl ether | 100 g/l |
| Glycerin | 115 g/l |
| Diethylene glycol | 70 g/l |
| 2-Pyrrolidone | 35 g/l |
| Triethanolamine (TEA) | 8 g/l |
| Surfynol STG | 10 g/l |

The oxidation potential of the yellow dye (YI-58) herein used was found to be larger than 1.0 V (vs SCE) even with any measurement method of the dropping mercury electrode method using a 1 mmol/l aqueous solution of dye, the cyclic voltametry (CV) method, and the rotating ring disk electrode method. It was found that $I(\lambda max+70\ nm)/I(\lambda max)<0.4$.

For the yellow ink Y-101 and the dark yellow ink DY-101, the counter cations of the yellow dyes were respectively changed as shown in Table 1 below, and trietanolamine (TEA) serving as a pH adjuster was changed to the respective inorganic salts described in Table 1, to produce respective ink sets. (All the parent nuclei of the yellow dyes (YI-58) are the same).

TABLE 1

| Ink set | Yellow Ink | Dark Yellow Ink |
|---|---|---|
| 101 (Invention) | Dye counter cation: Li Base: TEA | Dye counter cation: Li Base: TEA |
| 102 (Invention) | Dye Counter cation: Li Base: LiOH | Dye counter cation: Li Base: LiOH |
| 103 (Invention) | Dye counter cation: K Base: TEA | Dye counter cation: K Base: TEA |
| 104 (Invention) | Dye counter cation: Na Base: TEA | Dye counter cation: Na Base: TEA |
| 105 (Comparative Example) | Dye counter cation: K Base: Ca(OH)$_2$ | Dye counter cation: Na Base: Ca(OH)$_2$ |
| 106 (Comparative Example) | Dye counter cation: Na Base: Ca(OH)$_2$ | Dye counter cation: Na Base: Ca(OH)$_2$ |

The cations in these inks were measured by means of an ion chromatograph (made by Shimadzu Corp.). As for the inks of 101 to 104, no cation other than the cations of the invention was observed. Whereas, for the inks of 105 and 106, unpreferred calcium ions and the like, other than the cations of the invention were observed, and the content thereof was more than 0.5 wt %.

Subsequently, each of the inks 101 to 106 was charged in the yellow/light yellow ink unit of the cartridge of an ink jet printer PM950C (made by EPSON Corp.). Then, an image was printed on photo gloss paper EX of ink jet paper made by Fuji Photo Film Co., Ltd., by means of the same machine to evaluate fastness.

As for the image storage stability, yellow solid image printing samples with a stepwise changing density were formed, and the following evaluations were carried out.

1) The light fastness was evaluated in the following manner. The image density Ci immediately after printing was measured by means of X-rite 310, and thereafter, the image was irradiated with xenon light (85,000 lux) by means of a weather meter made by Atlas Corp., for 10 days. Then, the image density Cf was measured again, and the ratios of residual dye Cf/Ci*100 were determined. The ratios of residual dye were evaluated at 3 points with reflection densities of 1, 1.5, and 2. The case where the ratios of residual dye at all densities were not less than 70% was rated as A. The case where the ratios at two points were less than 70% was rated as B. The case where the ratios at all the densities were less than 70% was rated as C.

2) The heat fastness was evaluated in the following manner. The densities of each sample before and after storing the sample for 10 days under the conditions of 80° C. and 70% RH were measured by means of X-rite 310, and the ratios of residual dye were determined. The ratios of residual dye were evaluated at 3 points with reflection densities of 1, 1.5, and 2. The case where the ratios of residual dye at all densities were not less than 90% was rated as A. The case where the ratios at two points were less than 90% was rated as B. The case where the ratios at all the densities were less than 90% was rated as C. The case where discoloration and the like were observed was rated as D.

3) The ozone resistance was evaluated in the following manner. Each photo glass paper having the image formed thereon was allowed to stand in a box with an ozone gas concentration set at 0.5 ppm for 7 days. The image densities before and after standing under the ozone gas were determined by means of a reflection densitometer (X-Rite 310TR), and the ratios of residual dye were determined. Incidentally, measurements were carried out at 3 points with the reflection densities of 1, 1.5, and 2. The ozone gas concentration in the box was set by means of an ozone gas monitor (Model: OZG-EM-01) made by APPLICS. The case where the ratios of residual dye at all densities were not less than 80% was rated as A. The case where the ratios at one point or two points were less than 80% was rated as B. The case where the ratios at all the densities were less than 70% was rated as C. Thus, rating on a 1-to-3 scale was conducted.

4) The bronzing gloss was evaluated in the following manner. The sample in which bronzing gloss was clearly observable at a point with a reflection density of the stepwise printed part of not less than 2.2 was rated as X. The sample in which the bronzing gloss was observable by being illuminated with a light source was rated as Δ. The sample in which bronzing gloss was not observed at all was rated as ◯.

For every evaluation, PM-950C pure ink (yellow unit) was used as a comparative type.

The results are shown in Table 2.

TABLE 2

| | Light fastness | Heat fastness | Ozone fastness | Bronzing gloss |
|---|---|---|---|---|
| PM-950C | B | B | C | ◯ |
| 101 | A | A | A | ◯ |
| 102 | A | A | A | ◯ |
| 103 | A | A | A | Δ |
| 104 | A | A | A | Δ |

TABLE 2-continued

| | Light fastness | Heat fastness | Ozone fastness | Bronzing gloss |
|---|---|---|---|---|
| 105 | A | A | A | X |
| 106 | A | A | A | X |

It is indicated that the ink of the invention is excellent in any of weather fastnesses (light, heat, and ozone fastnesses). It is also indicated that the bronzing gloss is suppressed for the ink of the invention, and is not observed at all for the ink containing lithium ions.

In accordance with the invention, it is possible to provide a yellow-tone ink for ink jet recording which is excellent in weather fastnesses such as light fastness, heat fastness, and ozone fastness, and further provides high-quality images free from bronzing gloss.

This application is based on Japanese patent application JP 2002-285610, filed on Sep. 30, 2002, the entire content of which is hereby incorporated by reference, the same as if set forth at length.

What is claimed is:

1. An ink for ink jet recording, which comprises a dye having:
    a $\lambda$max in an aqueous solution of from 390 nm to 470 nm; and
    a $I(\lambda max+70\ nm)/I(\lambda max)$ ratio of not more than 0.4, in which $I(\lambda max)$ is the absorbance at $\lambda$max and $I(\lambda max+70\ nm)$ is the absorbance at $(\lambda max+70\ nm)$, the dye being dissolved and/or dispersed in an aqueous medium, and the dye is represented by formula (1), $$A-N=N-B \quad (1)$$

wherein A and B each independently represents a heterocyclic group which may be substituted,
    wherein the ink has a forced fading rate constant of not greater than $5.0 \times 10^{-2}$ [hour$^{-1}$], in which the forced fading rate constant is decided by printing the ink on a reflection type medium, thereafter measuring a reflection density through a Status A filter, specifying one point having a reflection density ($D_B$) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density, and
    the total amount of a cation in said ink except for a monovalent metal ion, a hydrogen ion, an ammonium ion, an organic quaternary nitrogen ion and an ion produced by the proton addition to a nitrogen atom in a basic organic material is 0.5 wt % or less.

2. The ink for ink jet recording according to claim 1, wherein the $\lambda$max in an aqueous solution of the dye is 390 nm to 470 nm, and the $I(\lambda max+70\ nm)/I(\lambda max)$ ratio is not more than 0.2.

3. The ink for ink jet recording according to claim 1, wherein the oxidation potential of the dye is more noble than 1.0 V (vs SCE).

4. The ink for ink jet recording according to claim 1, which comprises a lithium ion.

5. The ink for ink jet recording according to claim 1, wherein the cation in said ink except for a monovalent metal ion, a hydrogen ion, an ammonium ion, an organic quaternary nitrogen ion and an ion produced by the proton addition to a nitrogen atom in a basic organic material is at least one selected from the group consisting of magnesium ion, zinc ion, calcium ion, strontium ion, aluminum ion and a transition metal ion.

6. The ink for ink jet recording according to claim 1, wherein the dye represented by the formula (1) is at least one of dyes represented by the following formulae (2), (3) and (4):

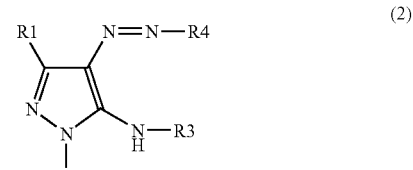

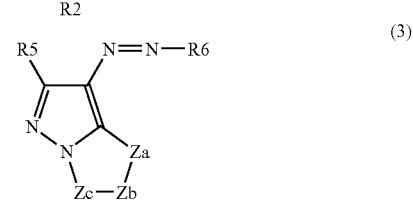

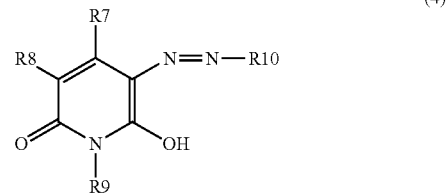

wherein R1 and R3 each represents a hydrogen atom, a cyano group, an alkyl group, a cycloalkyl group, an aralkyl group, an alkoxy group, an alkyl thio group, an aryl thio group, an aryl group, or an ionic hydrophilic group; R2 represents a hydrogen atom, an alkyl group, a cycloalkyl group, an aralkyl group, a carbamoyl group, an acyl group, an aryl group or a heterocyclic group;

R4 represents a heterocyclic group;

R5 represents a hydrogen atom, a cyano group, an alkyl group, a cycloalkyl group, an aralkyl group, an alkoxy group, an alkyl thio group, an aryl thio group, an aryl group or an ionic hydrophilic group; Za represents —N=, —NH— or —C(R11)=; Zb and Zc each independently represents —N= or —C(R11)=; R11 represents a hydrogen atom or a non-metal substituent; R6 represents a heterocyclic group, R7 and R9 each independently represents a hydrogen atom, a cyano group, an alkyl group, an a cycloalkyl group, aralkyl group, an aryl group, an alkyl thio group, an aryl thio group, an alkoxycarbonyl group, a carbamoyl group, or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkyl thio group, an aryl thio group, an alkoxycarbonyl group, a carbamoyl group, a sulfamoyl group, an alkylsulfonyl group, an aryl sulfonyl group, an acyl group, an amino group, a hydroxy group or an ionic hydrophilic group; R10 represents a heterocyclic group.

7. An ink set comprising the ink for ink jet recording according to claim 1.

* * * * *